United States Patent
Seino et al.

(10) Patent No.: US 10,305,071 B2
(45) Date of Patent: *May 28, 2019

(54) BATTERY PACKAGE INCLUDING BLACKBODY MATERIAL LAYER AND NONAQUEOUS ELECTROLYTE BATTERY INCLUDING THE SAME

(71) Applicant: Murata Manufacturing Co., Ltd., Kyoto (JP)

(72) Inventors: Hiroshi Seino, Fukushima (JP); Hideaki Ojima, Fukushima (JP); Fumihata Yamamoto, Fukushima (JP); Hiroyuki Yamada, Fukushima (JP); Satoru Tanaka, Fukushima (JP); Ryoko Sato, Fukushima (JP); Ryuji Soeda, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 245 days.

This patent is subject to a terminal disclaimer.

(21) Appl. No.: 15/195,468

(22) Filed: Jun. 28, 2016

(65) Prior Publication Data

US 2016/0308176 A1  Oct. 20, 2016

Related U.S. Application Data

(63) Continuation of application No. 14/920,491, filed on Oct. 22, 2015, now Pat. No. 9,431,639, which is a
(Continued)

(30) Foreign Application Priority Data

Oct. 30, 2009 (JP) .................................. 2009-250418

(51) Int. Cl.
*H01M 2/02* (2006.01)
*H01M 2/08* (2006.01)
(Continued)

(52) U.S. Cl.
CPC .......... *H01M 2/0287* (2013.01); *B32B 15/08* (2013.01); *B32B 15/085* (2013.01);
(Continued)

(58) Field of Classification Search
CPC ......... H01M 10/0525; H01M 10/6551; H01M 10/613; H01M 10/623; H01M 10/6554;
(Continued)

(56) References Cited

U.S. PATENT DOCUMENTS 4,239,837 A   12/1980  Hartmann et al.
4,818,588 A    4/1989  Okabe et al.
(Continued)

FOREIGN PATENT DOCUMENTS

CN    1767259         5/2006
CN    1776934 A       5/2006
(Continued)

OTHER PUBLICATIONS

Nishiyama et al., Machine translation of JP 2007-134308 A, May 2007 (Year: 2007).*
(Continued)

*Primary Examiner* — Sean P Cullen
(74) *Attorney, Agent, or Firm* — K&L Gates LLP

(57) ABSTRACT

A nonaqueous electrolyte battery and a battery package are provided. The nonaqueous electrolyte battery includes a battery element; a nonaqueous electrolyte; and a battery package configured to accommodate the battery element, wherein the battery package includes a first layer; a second layer including a carbon material; and a metal layer, wherein the second layer is directly provided on the metal layer.

16 Claims, 9 Drawing Sheets

Related U.S. Application Data continuation of application No. 14/582,724, filed on Dec. 24, 2014, now Pat. No. 9,236,584, which is a continuation of application No. 12/910,527, filed on Oct. 22, 2010, now Pat. No. 9,224,991.

(51) Int. Cl.

| | | |
|---|---|---|
| B32B 15/08 | (2006.01) | |
| B32B 15/09 | (2006.01) | |
| B32B 15/20 | (2006.01) | |
| B32B 27/08 | (2006.01) | |
| B32B 27/32 | (2006.01) | |
| B32B 27/34 | (2006.01) | |
| B32B 27/36 | (2006.01) | |
| B32B 15/085 | (2006.01) | |
| B32B 15/088 | (2006.01) | |
| H01M 10/052 | (2010.01) | |
| H01M 10/613 | (2014.01) | |
| H01M 10/623 | (2014.01) | |
| H01M 10/0525 | (2010.01) | |
| H01M 10/0587 | (2010.01) | |
| H01M 10/6551 | (2014.01) | |
| H01M 10/6554 | (2014.01) | |

(52) U.S. Cl.
CPC ............ *B32B 15/088* (2013.01); *B32B 15/09* (2013.01); *B32B 15/20* (2013.01); *B32B 27/08* (2013.01); *B32B 27/32* (2013.01); *B32B 27/34* (2013.01); *B32B 27/36* (2013.01); *H01M 2/026* (2013.01); *H01M 2/0267* (2013.01); *H01M 2/0295* (2013.01); *H01M 2/08* (2013.01); *H01M 10/0525* (2013.01); *H01M 10/0587* (2013.01); *H01M 10/613* (2015.04); *H01M 10/623* (2015.04); *H01M 10/6551* (2015.04); *H01M 10/6554* (2015.04); *B32B 2457/10* (2013.01); *H01M 10/052* (2013.01); *H01M 2002/0297* (2013.01); *H01M 2220/10* (2013.01); *H01M 2220/30* (2013.01)

(58) Field of Classification Search
CPC .... H01M 2/0287; H01M 2/08; H01M 2/0295; H01M 2/0267; H01M 2/026; B23B 15/08; B23B 15/088; B23B 15/09; B23B 15/20; B23B 15/085; B32B 27/08; B32B 27/32; B32B 27/34; B32B 27/36
USPC .................................................. 429/163, 176
See application file for complete search history.

(56) References Cited

U.S. PATENT DOCUMENTS

| | | | | |
|---|---|---|---|---|
| 4,959,281 | A * | 9/1990 | Nishi | H01M 4/587 423/445 R |
| 6,696,197 | B2 | 2/2004 | Inagaki et al. | |
| 6,716,552 | B2 | 4/2004 | Zhang et al. | |
| 2001/0049052 | A1* | 12/2001 | Gao | H01M 2/1077 429/99 |
| 2004/0229120 | A1 | 11/2004 | Hatta et al. | |
| 2006/0083984 | A1 | 4/2006 | Oh et al. | |
| 2006/0127760 | A1 | 6/2006 | Hatta | |
| 2007/0269714 | A1 | 11/2007 | Watanabe et al. | |

FOREIGN PATENT DOCUMENTS

| | | |
|---|---|---|
| CN | 1983669 | 6/2007 |
| CN | 102640319 | 8/2015 |
| JP | 62-119859 | 6/1987 |
| JP | A HEI 11-183258 | 12/1997 |
| JP | 2000010244 | 1/2000 |
| JP | 2002-208439 | 7/2002 |
| JP | 2002-231192 | 8/2002 |
| JP | 2002-292784 | 10/2002 |
| JP | 2003288865 | 10/2003 |
| JP | 2004-327042 | 11/2004 |
| JP | 2005-166650 | 6/2005 |
| JP | 2006086271 | 3/2006 |
| JP | 2006-114475 | 4/2006 |
| JP | 2007-134308 | 5/2007 |
| JP | 2007134308 | 5/2007 |
| JP | 2008-113872 | 5/2008 |
| JP | 2009-087875 | 4/2009 |
| JP | 2009-250418 | 10/2009 |
| JP | 2009-267026 | 11/2009 |
| JP | 2009-289542 | 12/2009 |
| JP | 2011-096552 | 5/2011 |

OTHER PUBLICATIONS

Notice of reasons for refusal issued in connection with Japanese Patent Application No. 2016-129170, dated Apr. 3, 2018. (2 pages).
Chinese Office Action (with English translation) dated Feb. 6, 2017 in corresponding Chinese application No. 2015106472015 (16 pages).
Chinese Office Action dated Jul. 11, 2014 in corresponding Chinese Application No. 201010530464.5.
Japanese Office Action dated Feb. 12, 2014 in corresponding Japanese Patent Application No. 2009-250418.
Chinese Office Action dated Nov. 14, 2013 in corresponding Chinese Patent Application No. 201010530464.5.
Japanese Office Action dated Aug. 20, 2013 in corresponding Japanese Patent Application No. 2009-250418.
Nagata et al., Machine translation of JP 2006-086271 A, Mar. 2006.
Japanese Office Action dated Jan. 20, 2015 in corresponding Japanese Patent Application No. 2014-117823.
Japanese Office Action dated Aug. 4, 2015 in corresponding Japanese Patent Application No. 2014-117823.
Norihumi Sasamori. Calculation of Emissivity by Measuring Reflectance and Transmittance. Research Report of Industrious Technique Research Laboratory Managed by Tokyo-to, Japan, 1999, No. 2, p. 45-48.
Office Action received in JP Application 2014117823, dated Mar. 29, 2016, 5 pages.
Japanese Office Action dated Aug. 4, 2015 in corresponding Japanese Application No. 2014117823.
Japanese Office Action dated Sep. 12, 2017 in corresponding Japanese patent application No. 2016-129170.
Chinese Office Action dated Oct. 25, 2017 in corresponding Chinese patent application No. 201510647205.3.
Japanese Office Action dated Sep. 13, 2016 issued in corresponding Japanese application No. 2014-117823 (2 pages).
Chinese Office Action dated Nov. 27, 2017 in corresponding Chinese patent application No. 201510647201.5.
Xiaohong, Wang et al., Principles of Chemistry Industry, Jun. 2009, pp. 91-93.
Japanese Office Action dated Jul. 3, 2018 in corresponding Japanese Application No. 2016-129170.
Chinese Decision on Rejection dated Jun. 1, 2018 in corresponding Chinese Application No. 201510647201.5.
Chinese Office Action for corresponding Chinese Application No. 201510647201.5, dated Nov. 22, 2018; (3 pages).

\* cited by examiner

BATTERY PACKAGE INCLUDING BLACKBODY MATERIAL LAYER AND NONAQUEOUS ELECTROLYTE BATTERY INCLUDING THE SAME

CROSS REFERENCES TO RELATED APPLICATIONS

The present application is a continuation of U.S. patent application Ser. No. 14/920,491, filed Oct. 22, 2015, now U.S. Pat. No. 9,431,639 which is a continuation of U.S. patent application Ser. No. 14/582,724 filed on Dec. 24, 2014, now U.S. Pat. No. 9,236,584 which is a continuation of U.S. patent application Ser. No. 12/910,527 filed on Oct. 22, 2010, now U.S. Pat. No. 9,224,991 which claims priority to Japanese Priority Patent Application JP 2009-250418 filed in the Japan Patent Office on Oct. 30, 2009, the entire content of which is hereby incorporated by reference.

BACKGROUND

The present invention relates to a nonaqueous electrolyte battery, and more particularly relates to a nonaqueous electrolyte battery having high heat dissipation characteristics.

In recent years, reduction in size and weight of mobile information terminals, such as a mobile phone, a notebook type personal computer, and a personal digital assistant (PDA), has been rapidly advanced, and hence batteries used as a drive power source therefor are strongly desired to have a higher capacity. Since having a high energy density and a high capacity, nonaqueous electrolyte batteries represented by a lithium ion secondary battery have been widely used as a drive power source for the mobile information terminals mentioned above.

Technical development on the safety of a related lithium ion battery has been carried out in consideration of the cases of various incorrect uses. In view of suppression of heat generation, the above technical development can be further roughly categorized into two types, that is, an improvement in properties of battery materials and an improvement in structure and mechanism of batteries. The development of a flame retardant electrolyte, the use of positive and negative active materials which generate a small amount of heat, and the like are categorized into the former group, and the prevention of overcharge and over-discharge by an external protective circuit, the reduction in inside pressure by a safety valve in gas ejection, and the like are categorized into the latter group.

For example, as disclosed in Japanese Unexamined Patent Application Publication No. 2002-208439, as for the structure to improve the heat conduction, a technique in which an anode or a cathode is thermally contacted to a metal package has been proposed.

SUMMARY

However, in Japanese Unexamined Patent Application Publication No. 2002-208439, as for the promotion of heat dissipation, the heat conduction inside a battery and the heat transfer between an outer surface of the battery and the outside environment are only taken into consideration; hence, a new and significant technique has not been developed. Hence, the use of a battery material having a high safety has been a fairly difficult subject due to a trade-off with the performance, such as the battery capacity, and a time period necessary for searching a novel material. In addition, as for the suppression of heat generation by a novel battery structure and mechanism, a new and significant technique has also been desired.

In view of the promotion of heat dissipation which is another approach to the technical development in safety, it is believed that the use of a battery material having an excellent heat conductivity leads to the promotion of heat dissipation (for example, see Japanese Unexamined Patent Application Publication No. 62-119859). However, again, the battery material was not easily changed due to the trade-off with the performances.

As for the heat dissipation, besides the heat conduction and the heat transfer, each of which is caused by a heat flux proportional to the difference in temperature, a phenomenon has been understood in which heat radiation produces a heat flux proportional to the difference in the fourth power of temperature; however, an attempt to use this phenomenon has been rarely carried out. The reason for this is supposed that since the radiation becomes dominant when the temperature is extremely high, such as several thousands degrees centigrade, compared to room temperature, it is prejudiced that the radiation has no effect on internal heat generation of a battery at a temperature of at most several hundreds degrees centigrade.

In consideration of the problem described above, it is desirable to provide a nonaqueous electrolyte battery capable of improving its heat dissipation characteristics and of exhibiting a high safety even if heat is generated inside the battery.

According to an embodiment of the present invention, there is provided a nonaqueous electrolyte battery which includes a battery element, and a package member for packaging the battery element, and in this nonaqueous electrolyte battery, the package member has a layer which contains a blackbody material capable of using blackbody radiation and which has an emissivity of 0.6 or more.

It is preferable that the package member includes an outer layer film, a metal foil, an inner layer film, and an adhesive layer, and at least one of the outer layer film, the inner layer film, and the adhesive layer contains the blackbody material, or the package member includes a blackbody material layer containing the blackbody material between the outer layer film and the metal foil or between the metal foil and the inner layer film.

It is preferable that the blackbody material layer containing the blackbody material is provided between the metal foil and the outer layer film or that the outer layer film contains the blackbody material.

It is preferable that the blackbody material includes at least one of a carbon material, a silicate material, and a metal oxide material and has an average particle diameter of 1.0 μm or less.

In the present invention, since the layer containing the blackbody material is provided in the laminate film to form the package member for the battery element, the heat dissipation characteristics by radiation can be improved.

According to the present invention, an increase in temperature of the nonaqueous electrolyte battery can be suppressed, and the safety thereof can be improved.

Additional features and advantages are described herein, and will be apparent from the following Detailed Description and the figures.

DETAILED DESCRIPTION

Hereinafter, the best mode (hereinafter referred to as "embodiment") for carrying out the present invention will be described.

(1) First Embodiment (example of a nonaqueous electrolyte battery including a laminate film as a package member).

(2) Second Embodiment (example of a nonaqueous electrolyte battery including a hard laminate film and a soft laminate film as a package member).

(1) First Embodiment (1-1) Structure of Nonaqueous Electrolyte Battery

Figure 1:
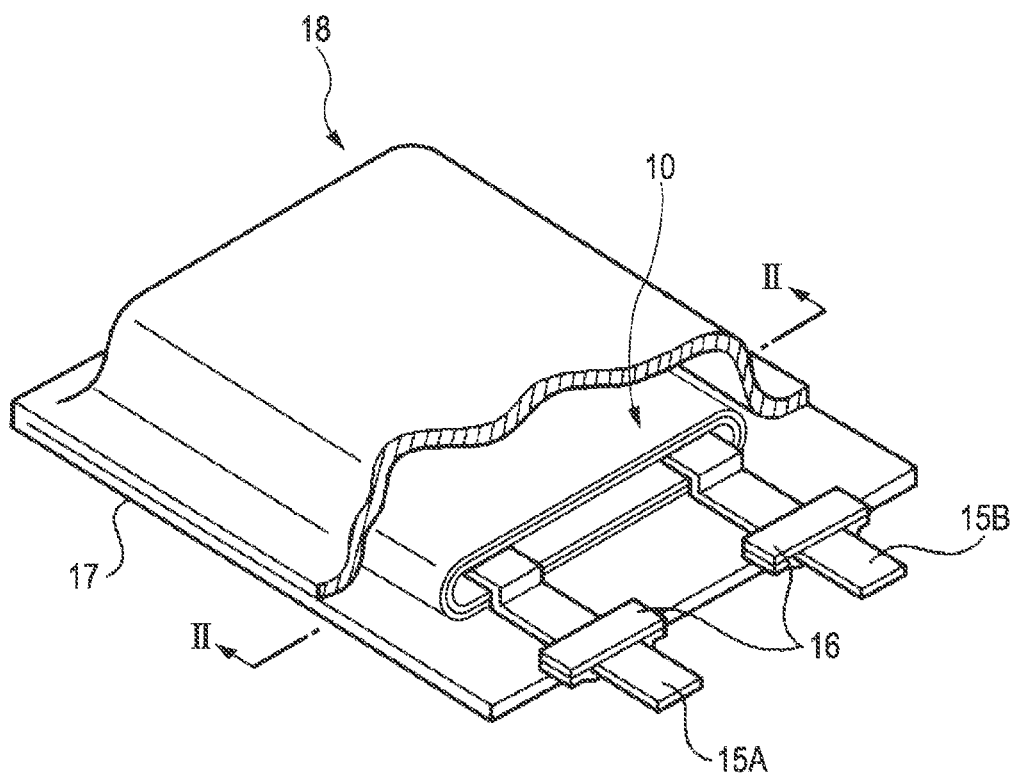
FIG. 1 is an exploded perspective view showing one structural example of a nonaqueous electrolyte battery according to a first embodiment of the present invention.
Figure 2:
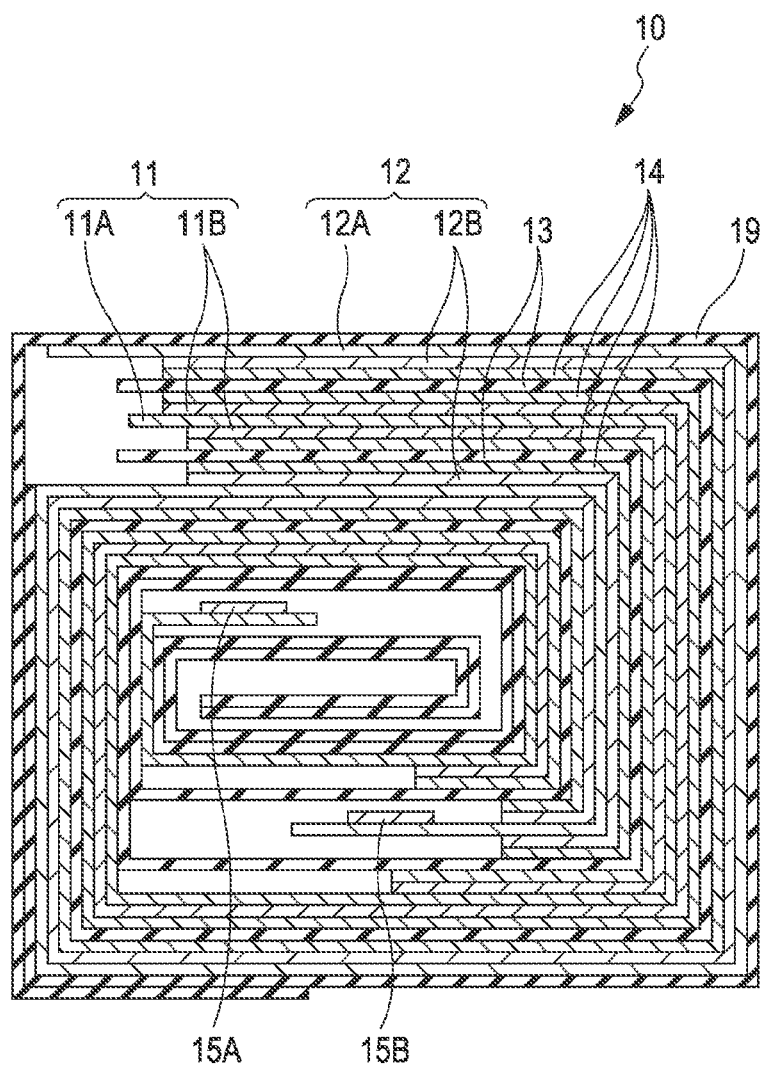
FIG. 2 is a cross-sectional view showing one structural example of a battery element according to the first embodiment of the present invention.

First, the structure of a nonaqueous electrolyte battery according to a first embodiment of the present invention will be described. FIG. 1 is an exploded perspective view showing the structure of a nonaqueous electrolyte battery 20, and FIG. 2 is a cross-sectional view showing an important portion of the nonaqueous electrolyte battery 20 shown in FIG. 1 taken along the line II-II. The nonaqueous electrolyte battery 20 described in this embodiment is a so-called lithium ion secondary battery in which, for example, the capacity of a negative electrode is expressed by a capacity component based on occlusion and release of a light metal (such as lithium).

As shown in FIG. 1, this nonaqueous electrolyte battery 20 has a thin type battery structure in which a battery element 10 provided with a positive electrode terminal 15A and a negative electrode terminal 15B is received between laminate films 17. The nonaqueous electrolyte battery 20 is formed in such a way that the battery element 10 is packaged by being received in a battery element receiving portion 18, which is a recess portion formed by one laminate film 17 to receive a battery element, followed by sealing a peripheral portion of the battery element 10. The laminate films 17 each have a heat fusion layer of a resin material which faces the battery element 10. Subsequently, the two-layered laminate films 17 disposed so that the heat fusion layers thereof face each other are sandwiched with heat blocks of a metal or the like; hence, the heat fusion layers of the laminate films 17 are fused so that the laminate films 17 are adhered to each other. The detailed structure of the laminate film 17 will be described later.

Structure of Battery Element

Hereinafter, the structure of the battery element 10 will be described.

As shown in the cross-sectional view of FIG. 2, in the battery element 10 according to the first embodiment of the present invention, a belt shaped positive electrode 11, a separator 13, and a belt shaped negative electrode 12, and a separator 13 are laminated in this order and are wound in a longitudinal direction. In addition, the positive electrode terminal 15A connected to the positive electrode 11 and the negative electrode terminal 15B connected to the negative electrode 12 (hereinafter each referred to as "electrode terminal" unless otherwise specifically indicated) are extended from the battery element 10. Tight sealing members 16 which are each a sealing member to improve adhesiveness are provided at the positive and the negative electrode terminals 15A and 15B at which the laminate films 17 are fused to each other, the laminate films 17 each being used as a package member for packaging the battery element 10. As the tight sealing member 16, for example, a resin film formed of a polypropylene (PP) or the like may be used. In addition, a resin film of a modified resin material which has a high adhesiveness to the electrode terminal made of a metal may also be used.

The positive electrode terminal 15A and the negative electrode terminal 15B are, for example, both extended in the same direction from the inside to the outside of the laminate films 17. The positive electrode terminal 15A is formed, for example, of a metal material, such as aluminum (Al), and has a thin-plate or a mesh structure. Aluminum (Al) is preferable since it is passivated so as not to be dissolved and has an excellent electrical conductivity. The negative electrode terminal 15B is formed, for example, of a metal material, such as copper (Cu), nickel (Ni), or stainless steel, and has a thin-plate or a mesh structure. Copper (Cu), nickel (Ni), stainless steel, or the like is preferable since forming no alloy with lithium. Among these mentioned above, copper is particularly preferable since having a high electrical conductivity.

Positive Electrode

The positive electrode 11 includes, for example, a positive electrode collector 11A and positive electrode active material layers 11B provided on two surfaces thereof. The positive electrode collector 11A is formed, for example, of a metal material, such as aluminum (Al). The positive electrode active material layer 11B contains a positive electrode active material and a binder and whenever necessary, may further contain a conductive agent and the like.

The positive electrode active material contains at least one type of positive electrode material which is able to occlude and release lithium functioning as an electrode reaction material and which has a reaction potential, for example, of 3 to 4.5 V with respect to lithium. As the positive electrode material described above, for example, a composite oxide containing lithium may be mentioned. In particular, as a composite oxide between lithium and a transition metal, lithium cobaltate ($LiCoO_2$) or lithium nickelate ($LiNiO_2$), each of which has a layered structure, may be used, or alternatively a solid solution containing the oxide mentioned above ($LiNi_xCo_yMn_zO_2$, in this formula, x, y, and z satisfy $0<x<1$, $0<y<1$, $0<z<1$, and $x+y+z=1$) may also be used.

In addition, as the positive electrode material, for example, lithium manganate ($LiMn_2O_4$) having a spinel structure or a solid solution thereof ($Li(Mn_{2-v}Ni_v)O_4$, in this formula, v is less than 2) may also be used. Furthermore, as the positive electrode material, for example, a phosphate compound, such as lithium iron phosphate ($LiFePO_4$), having an olivine structure may also be used. The reason for this is that a high energy density can be obtained. In addition, as the positive electrode material, besides the materials mentioned above, for example, there may also be used an oxide, such as titanium oxide, vanadium oxide, or magnesium oxide; a disulfide, such as iron disulfide, titanium disulfide, or molybdenum disulfide; sulfur; or a conductive polymer, such as a polyaniline or a polythiophene.

As the positive electrode binder, a polymer containing vinylidene fluoride (VdF) as a component is contained. The reason for this is that as in the case of an electrolyte layer 14, when vinylidene fluoride is contained as one component, the adhesion of the electrolyte layer 14 to the positive electrode 11 is improved. This polymer may be a homopolymer (poly(vinylidene fluoride)) or a copolymer containing vinylidene fluoride as one component. Although the content of the positive electrode binder in the positive electrode active material layer 11B is not particularly limited, for example, the content is in the range of 1 to 10 percent by weight. This content is preferably low when the weight average molecular weight of the polymer forming the positive electrode binder is high, and on the other hand, the content is preferably high when the above weight average molecular weight is low. In addition, for example, besides the polymer containing vinylidene fluoride as one component, the binder may also include at least one of other polymers and copolymers. As the conductive agent, for example, carbon materials, such as graphite and acetylene black, may be mentioned.

Negative Electrode

The negative electrode 12 includes, for example, a negative electrode collector 12A and negative electrode active material layers 12B provided on two surfaces thereof. The negative electrode collector 12A is formed, for example, of a metal material, such copper, nickel, or stainless steel. The negative electrode active material layer 12B contains a negative electrode active material and a negative electrode binder and whenever necessary, may further contain a conductive agent (such as a carbon material) and the like.

The negative electrode active material contains at least one type of negative electrode material which is able to occlude and release lithium. As this negative electrode material, for example, a carbon material, a metal, a metal oxide, silicon, or a polymer material may be mentioned. As the carbon material, for example, there may be used at least one of a non-graphitizable carbon, an easy-graphitizable carbon, graphites, pyrolytic carbons, cokes, glassy carbons, a sintered organic polymer compound, carbon fibers, and an active carbon. In particular, since having an excellent chemical stability, being capable of stably repeating an insertion/extraction reaction of lithium ions, and being easily commercially available, the graphites, such as a natural graphite and an artificial graphite, have been widely used for lithium ion batteries. In addition, as the types of graphites, for example, natural graphites and artificial graphites, such as mesophase carbon microbeads, carbon fibers, and cokes, may be mentioned. Since having a very small change in crystal structure caused by occlusion and release of lithium and also functioning as a conductive agent, the carbon material is preferably used.

In addition, as the negative electrode material, for example, there may be mentioned a material containing at least one type of metal element and half metal element as a constituent element, each of which is capable of forming an alloy with lithium. This type of material is preferable since a high energy density can be obtained. As this negative electrode material, an element, an alloy, or a compound of a metal or a half metal may be used, and a material at least partially containing at least one phase of these mentioned above may also be used. In addition, as the alloy according to an embodiment of the present invention, besides an alloy formed of at least two metal elements, an alloy formed of at least one metal element and at least one half metal element may also be used. As a mater of course, the alloy may also include a non-metal element. In this texture, a solid solution, a eutectic crystal (eutectic mixture), an intermetallic compound, or a mixture of at least two thereof may be present in some cases.

As the material containing at least one of a metal element and a half metal element as a constituent element, for example, materials containing silicon or tin may be mentioned. The reason for this is that since having a high capability of occluding and releasing lithium, the materials mentioned above produce a high energy density. These materials may be used alone or in combination.

As the particular example of these materials, for example, a material containing tin as a first constituent element and also containing a second and a third constituent element is preferable, and in particular, a material (CoSnC material) containing tin, cobalt, and carbon as constituent elements is preferable. The reason for this is that excellent cycle properties can be obtained as well as obtaining a high energy density. This CoSnC-containing material may further contain another constituent element if necessary. The reason for this is that the battery capacity and the cycle properties are further improved.

In addition, as the particular example of the material mentioned above, for example, an element, an alloy, or a compound of tin, or an element, an alloy, or a compound of silicon may be mentioned. In this case, for example, it is preferable that the negative electrode active material layer 12B is formed by a vapor phase method, a liquid phase method, a flame spray method, a firing method, or a method using at least two of these mentioned above and that the negative electrode active material layer 12B and the negative electrode collector 12A form an alloy at at least part of the interface therebetween. The reasons for this are that the negative electrode active material layer 12B is not likely to be fractured due to expansion and contraction caused by charge and discharge and that the electron conductivity is improved between the negative electrode collector 12A and the negative electrode active material layer 12B. As the vapor phase method, for example, a physical deposition method and a chemical deposition method may be mentioned, and more particularly, there may be mentioned a vacuum deposition method, a sputtering method, an ion plating method, a laser abrasion method, a thermal chemical vapor deposition (CVD) method, or a plasma chemical vapor deposition method. As the liquid phase method, a common method, such as electroplating or electroless plating, may be used. As the firing method, for example, there may be mentioned a method in which after a negative electrode active material in the form of particles, a binder, and the like are mixed together and dispersed in a solvent, the dispersion thus obtained is applied, and a heat treatment is then performed at a temperature higher than a melting point of the negative electrode binder or the like. As the firing method, a common method may also be used, and for example, an atmosphere firing method, a reactive firing method, or a hot press firing method may be mentioned.

As the negative electrode binder, for example, a poly (vinylidene fluoride) (PVdF) may be used.

In this secondary battery, since the charge capacity of the negative electrode active material is larger than that of the positive electrode active material, the relationship of the charge capacity between the positive electrode 11 and the negative electrode 12 is adjusted so that a lithium metal is not deposited on the negative electrode 12 even in a completely charged state.

Separator

The separator 13 separates the positive electrode 11 from the negative electrode 12 and allows lithium ions to pass through while preventing short circuit caused by contact between the two electrodes. This separator 13 is composed of a porous film of a synthetic resin, such as a polytetrafluoroethylene (PTFE), a polypropylene (PP), or a polyethylene (PE), or a porous film of a ceramic or the like. The separator 13 may be a laminate composed of at least two porous films mentioned above.

Electrolyte

The electrolyte layer 14 contains an electrolytic solution and a retainer containing a polymer compound which retains this electrolytic solution, so that a so-called gel is formed. The electrolytic solution contains an electrolytic salt and a solvent dissolving this electrolytic salt. As the electrolytic salt, a lithium salt may be used. As the lithium salt, for example, there may be mentioned an inorganic lithium salt, such as lithium hexafluorophosphate ($LiPF_6$), lithium tetrafluoroborate ($LiBF_4$), lithium hexafluoroarsenate ($LiAsF_6$), lithium hexafluoroantimonate ($LiSbF_6$), lithium perchlorate ($LiClO_4$), or lithium tetrachloroaluminate ($LiAlCl_4$), or a perfluoroalkane sulfonic acid derivative, such as lithium trifluoromethanesulfonate ($LiCF_3SO_3$), lithium bis(trifluoromethanesulfonyle)imide ($LiN(CF_3SO_2)_2$), lithium bis (pentafluoroethanesulfonyle)imide ($LiN(C_2F_5SO_2)_2$), or lithium tris(trifluoromethanesulfonyle)methyde ($LiC(CF_3SO_2)_3$). These compounds mentioned above may be used alone or in combination. Among these mentioned above, lithium hexafluorophosphate ($LiPF_6$) is preferable since a high ion conductivity can be obtained and the cycle properties can be improved.

As the solvent, a nonaqueous solvent may be used, and in particular, for example, there may be used a lactone solvent, such as γ-butyrolactone, γ-valerolactone, δ-butyrolactone, or ε-caprolactone; a carbonate solvent, such as ethylene carbonate, propylene carbonate, butylene carbonate, vinylene carbonate, dimethyl carbonate, ethyl methyl carbonate, or diethyl carbonate; an ether solvent, such as 1,2-dimethoxyethane, 1-ethoxy-2-methoxyethane, 1,2-diethoxyethane, tetrahydrofuran, or 2-methyl tetrahydrofuran; a nitrile solvent, such as acrylonitrile; a sulfolane solvent; phosphoric acids; a phosphoric acid ester solvent; or pyrrolidones. As the solvent, these mentioned above may be used alone or in combination.

In addition, as the solvent, a compound in which hydrogen atoms of a cyclic ester or a chain ester are partially or entirely replaced with fluorine is preferably contained. As this fluorinated compound, difluoroethylene carbonate (4,5-difluoro-1,3-dioxolane-2-on) is preferably used. The reason for this is that even when a negative electrode 12 containing a compound of silicon (Si), tin (Sn), germanium (Ge), or the like as the negative electrode active material is used, charge/discharge cycle properties can be improved, and that in particular, difluoroethylene carbonate has an excellent cycle characteristic improvement effect.

As the polymer compound, any compound which absorbs a solvent and turns into a gel may be used, and for example, there may be mentioned a fluorinated polymer compound, such as poly(vinylidene fluoride) or a copolymer of vinylidene fluoride and hexafluoropropylene, an ether polymer compound, such as a cross-linked compound containing a poly(ethylene oxide) or a poly(ethylene oxide), or a polymer compound containing acrylonitrile, propylene oxide, or methyl methacrylate as a repeating unit. The polymer compounds mentioned above may be used alone or in combination. In particular, in view of oxidation/reduction stability, a fluorinated polymer compound is preferable, and a copolymer containing vinylidene fluoride and hexafluoropropylene as components is particularly preferable.

Laminate Film

The laminate film 17 includes a metal foil and resin films provided on two surfaces thereof. In addition, the laminate film 17 has a layer containing a blackbody material which has properties capable of using blackbody radiation. Hereinafter, the laminate film will be described in detail.

As the laminate film 17, for example, a laminate film having an outer layer film functioning as a protective layer, a metal foil, and an inner layer film functioning as a heat fusion layer is used as a basis structure. In addition, adhesive layers may be provided between the individual layers. In the present invention, the laminate film 17 further has a blackbody material layer containing the blackbody material which has properties capable of using blackbody radiation, or the blackbody material is contained in at least one of the outer layer film, the inner layer film, and the adhesive layer. In addition, whenever necessary, in order to impart additional properties, such as the strength, to a package material, the structure in which an intermediate resin layer is provided between the outer layer and the metal foil or between the inner layer and the metal foil may also be used. In this case, the properties of the resin are not particularly limited, and in accordance with the property to be desirably imparted to the package material, resin properties (such as type of resin, mechanical properties, thickness, degree of crystallinity, and multilayer formation ability) may be selected.

As the laminate 17, for example, the following structures may be mentioned.

(1) Outer layer film/blackbody material layer/adhesive layer/metal foil/adhesive layer/inner layer film (2) Outer layer film/adhesive layer/blackbody material layer/metal foil/adhesive layer/inner layer film (3) Outer layer film in which the blackbody material is dispersed/adhesive layer/metal foil/adhesive layer/inner layer film (4) Outer layer film/adhesive layer in which the blackbody material is dispersed/metal foil/adhesive layer/inner layer film (5) Outer layer film/blackbody material layer/outer layer film/adhesive layer/metal foil/adhesive layer/inner layer film (6) Outer layer film/adhesive layer/metal foil/adhesive layer/blackbody material layer/inner layer film (7) Outer layer film/adhesive layer/metal foil/blackbody material layer/adhesive layer/inner layer film (8) Outer layer film/adhesive layer/metal foil/adhesive layer/inner layer film in which the blackbody material is dispersed (9) Outer layer film/adhesive layer/metal foil/adhesive layer in which the blackbody material is dispersed/inner layer film This nonaqueous electrolyte battery 20 has, for example, the structure in which outer peripheral portions of two rectangular laminate films 17 are fused to each other or adhered with an adhesive interposed therebetween so that the inner layer films thereof face the battery element 10.

As the blackbody material having a black color, for example, there may be used carbon materials, such as graphites and fullerenes, silicates materials, and black metal oxide materials, such as an iron oxide (magnetite: triiron tetraoxide), a composite oxide of copper (Cu) and chromium (Cr), and a composite oxide of copper (Cu), chromium (Cr), zinc (Zn), and titanium (Ti). In particular, carbon black, graphite, aniline black, iron black ($FeOFe_2O_3$), a chromite spinel solid solution, and the like may be used. In addition, other materials having sufficient properties capable of using blackbody radiation may also be used.

Incidentally, the black color indicates a color in which in the CMY color model, C(cyan), M(magenta), and Y(yellow) are all at 70 or more.

The blackbody material preferably has a particle diameter of 1.0 μm or less and more preferably 0.5 μm or less. When the blackbody material layer is provided, by decreasing the thickness thereof as small as possible, degradation in properties as the outer layer material can be suppressed. In addition, the radiation amount is proportional to the surface area. By the reasons described above, the particle diameter is preferably decreased.

Hereinafter, the individual structures will be described.

(a) The case in which the blackbody material layer is provided.

Figure 3:
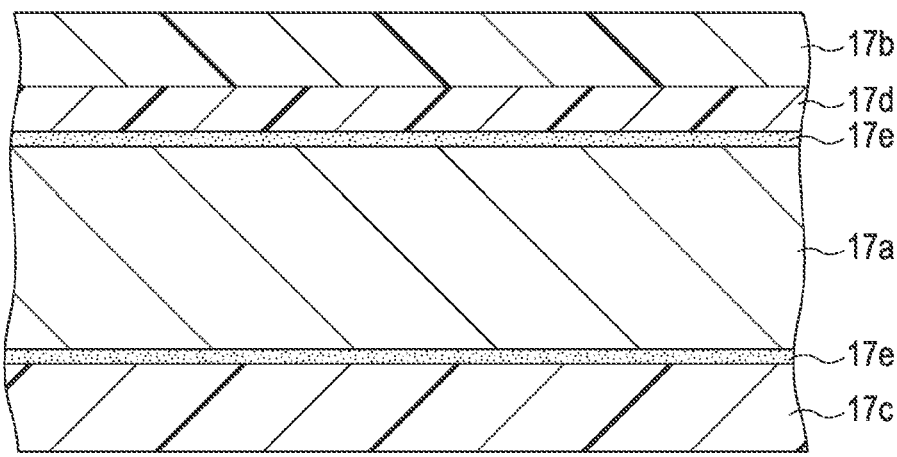
FIG. 3 is a cross-sectional view showing one structural example of a package member used for the nonaqueous electrolyte battery according to the first embodiment of the present invention.
Figure 11:
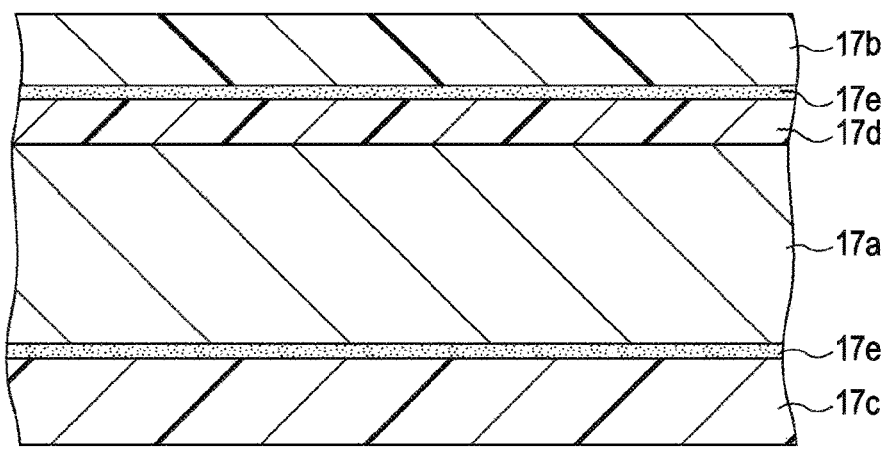
FIG. 11 is a cross-sectional view showing another structural example of the package member used for the nonaqueous electrolyte battery according to the first embodiment of the present invention.

Hereinafter, the structure (such as (1), (2), (5), (6), or (7)) in which the blackbody material layer is provided will be described. For example, the structure (1) is shown in FIG. 3. As shown in FIG. 3, a laminate film 17 having the structure (1) includes a metal foil 17a, an outer layer film 17b, an inner layer film 17c, a blackbody material layer 17d, and a second material layer, for example, adhesive layers 17e. The structure (2) is shown in FIG. 11. As shown in FIG. 11, a laminate film 17 having the structure (2) includes a metal foil 17a, an outer layer film 17b, an inner layer film 17c, a blackbody material layer 17d, and a second material layer, for example, an adhesive layer 17e provided between the outer layer film 17b and the blackbody material layer 17d.

The blackbody material layer 17d includes the blackbody material and a base resin and independently has an emissivity of 0.6 or more. Additives may be added to the blackbody material layer 17d if necessary. As the base resin, for example, an acrylic resin, a urethane resin, or an epoxy resin may be used. As the additives, a curing agent, an antioxidant, and the like may be used.

In addition, after a material containing the blackbody material is formed on the surface of an aluminum (Al) foil to have a thickness of 10 μm, the emissivity of the surface of the blackbody material-containing layer thus formed is measured by a reflection measurement method. The emissivity is obtained in such a way that the reflectance is measured by obtaining the average reflection intensity in a wavelength region of 4 to 24 μm (2,500 $cm^{-1}$ to 400 $cm^{-1}$) using a Fourier transformer infrared (FT-IR) spectrometer, and the emissivity (in the range of 0 to 1) was obtained from the equation: (1-reflectance).

Incidentally, the emissivity is determined by the type of blackbody material. In addition, when the blackbody material is formed from the same material, although the emissivity is not changed by the change in thickness of a blackbody material-containing layer, the radiation amount is changed. Hence, the emissivity measured from a blackbody material-containing layer having a thickness of 10 μm can be regarded to be equivalent to the emissivity of a blackbody material-containing layer having a thickness of 2 μm as long as it contains the same blackbody material as that of the above layer.

In addition, in order to suppress degradation in properties as the package member, the thickness of the blackbody material layer 17d is preferably set in the range of 1 to 10 μm. The blackbody material layer 17d is preferably formed as thin as possible while maintaining an emissivity of 0.6 or more.

The metal foil 17a functions to protect the battery element 10 by preventing invasion of moisture, oxygen, and light as well as to improve the strength of the package member. As the metal foil 17a, a soft metal material is used, and for example, aluminum (Al), stainless steel (SUS), titanium (Ti), copper (Cu), or iron (Fe) plated with tin (Sn), zinc (Zn), or nickel (Ni) may be appropriately used. Among these mentioned above, for example, aluminum processed by an annealing treatment (such as JIS A8021P-O) or (JIS A8079P-O) is preferably used.

The thickness of the metal foil 17a is preferably set in the range of 50 to 150 μm. When the thickness is less than 50 μm, the material strength is degraded. On the other hand, when the thickness is more than 150 μm, the workability is seriously degraded, and in addition, since the thickness of the laminate film 17 is increased, the volume efficiency of the nonaqueous electrolyte battery 20 is degraded.

The outer layer film 17b may have to have clean and fine appearance, toughness, flexibility, and the like, and for example, a nylon (Ny), a poly(ethylene terephthalate) (PET), a poly(ethylene naphthalate) (PEN), a poly(butylene terephthalate) (PET), or a poly(butylene naphthalate) (PBN) may be used.

The thickness of the outer layer film 17b is preferably set in the range of 5 to 30 μm. When the thickness of the outer layer film is too large, the heat dissipation characteristics are degraded. On the other hand, when the outer layer film is too small, the function as the protective layer may be degraded in some cases.

Whenever necessary, letters, patterns, and the like may be drawn on the outer surface of the outer layer film 17b. In addition, the blackbody material layer 17d may be formed by application on places other than those of the letters, patterns, and the like. Colors, shapes, and arrangement of the letters, patterns, and the like are not particularly limited, and the letters and patterns may not be concentrated on a part of the outer surface. Regardless of modes of the letters and patterns, the heat dissipation effect can be obtained proportional to the area of the blackbody material exposed at the outer surface. The letters and patterns are necessarily designed in consideration of the heat dissipation effect.

The inner layer films 17C are films melted by heat and/or ultrasonic waves and are fused to each other, and for example, a polyethylene (PE), a polypropylene (PP), a cast polypropylene (CPP), or a poly(ethylene terephthalate) (PET) may be used. In addition, a plurality of the polymers mentioned above may be selected and used. As the polyethylene (PE), a low-density polyethylene (LDPE), a high-density polyethylene (HDPE), a linear low-density polyethylene (LLDPE) may be used.

The thickness of the inner layer film 17c is preferably set in the range of 10 to 50 μm. When the inner layer film 17c is too thick, the rate of heat conduction from the battery element 10 to the metal foil 17a is low, and hence the heat dissipation characteristics are degraded. In addition, when the inner layer film 17c is too thin, the sealing properties are degraded when the battery element 10 is sealed by packaging.

As an adhesive material used for the adhesive layer 17e, an adhesive of a urethane resin, an acrylic resin, a styrene resin, or the like may be used, which has been used for forming a laminate film. In addition, when a resin material having a heat adhesion effect to a metal is used, direct adhesion may be performed by a heat roller, and bonding may also be performed by coating of a resin material melted or diluted with a solvent using extrusion or the like.

In the structure in which the blackbody material layer 17d is provided, since the blackbody material layer 17d is simply provided in a related basic structure, the difference in properties from the basic structure is small, and hence the production and the use thereof are easily carried out. In addition, the adhesive layer 17e may not be used in some cases and may be used if necessary for a laminate formation.

(b) The case in which an outer layer film containing the blackbody material dispersed therein is used.

Figure 4:
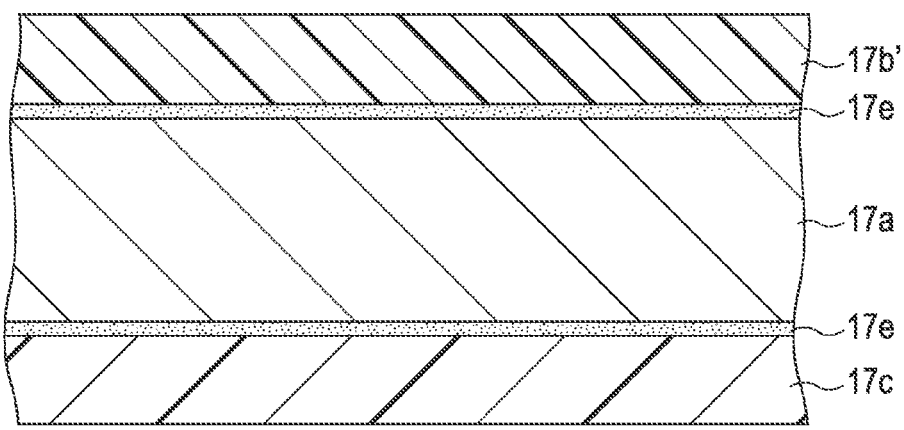
FIG. 4 is a cross-sectional view showing another structural example of the package member used for the nonaqueous electrolyte battery according to the first embodiment of the present invention.

Hereinafter, the structure (such as (3)) using an outer layer film in which the blackbody material is dispersed will be described. The structure (3) is shown in FIG. 4. As shown in FIG. 4, a laminate film 17 having a structure as that of (3) includes the metal foil 17a, an outer layer film 17b' in which the blackbody material is dispersed, the inner layer film 17c, and the adhesive layers 17e.

As the outer layer film 17b' in which the blackbody material is dispersed, for example, a film formed by dispersing the blackbody material in a material, such as a nylon (Ny), a poly(ethylene terephthalate) (PET), a poly(ethylene naphthalate) (PEN), a poly(butylene terephthalate) (PBT), or a poly(butylene naphthalate) (PBN), may be used.

In this case, the outer layer film 17b' independently has an emissivity of 0.6 or more. The content of the blackbody material in the outer layer film 17b' is preferably in the range of 50 to 80 percent by weight or more of the outer layer film 17b'. When the content of the blackbody material is too low, the heat dissipation characteristics are degraded. On the other hand, when the content of the blackbody material is too high, the strength and the function of the outer layer film may be degraded in some cases.

In addition, except that the outer layer film 17b' in which the blackbody material is dispersed is used, and that the blackbody material layer is not provided, the structure similar to that of the (a) may be formed. In addition, the adhesive layer 17e may not be necessary in some cases and may be used if necessary for laminate formation.

(c) The case in which an inner layer film containing the blackbody material dispersed therein is used.

Figure 5:
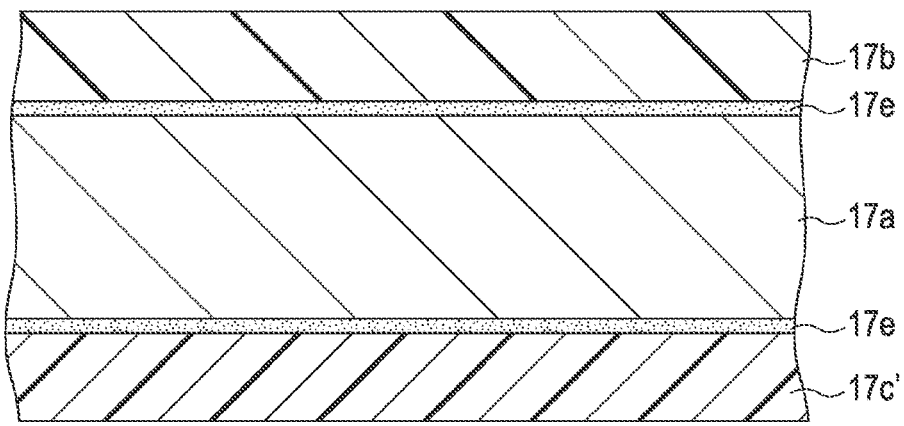
FIG. 5 is a cross-sectional view showing another structural example of the package member used for the nonaqueous electrolyte battery according to the first embodiment of the present invention.

Hereinafter, the structure (such as (8)) using an inner layer film in which the blackbody material is dispersed will be described. The structure (8) is shown in FIG. 5. As shown in FIG. 5, a laminate film 17 having a structure as that of (8) includes the metal foil 17a, the outer layer film 17b, and an inner layer film 17c' in which the blackbody material is dispersed, and the adhesive layers 17e.

As the inner layer film 17c' in which the blackbody material is dispersed, a film formed by dispersing the blackbody material in a material, such as a polypropylene (PP), a cast polypropylene (CPP), a poly(ethylene terephthalate) (PET), a low-density polyethylene (LDPE), a high-density polyethylene (HDPE), or a linear low-density polyethylene (LLDPE), may be used.

In this case, the inner layer film 17c' independently has an emissivity of 0.6 or more. The content of the blackbody material in the inner layer film 17c' is preferably in the range of 60 to 80 percent by weight of the inner layer film. When the content of the blackbody material is too low, the heat dissipation characteristics are degraded. In addition, when the content of the blackbody material is too high, the strength and the function of the inner layer film may be degraded in some cases.

In addition, except that the inner layer film 17c' in which the blackbody material is dispersed is used, and that the blackbody material layer 17d is not provided, the structure similar to that of the (a) may be formed. In addition, the adhesive layer 17e may not be used in some cases and may be used if necessary for laminate formation.

(d) The case in which an adhesive layer containing the blackbody material dispersed therein is used.

Figure 6:
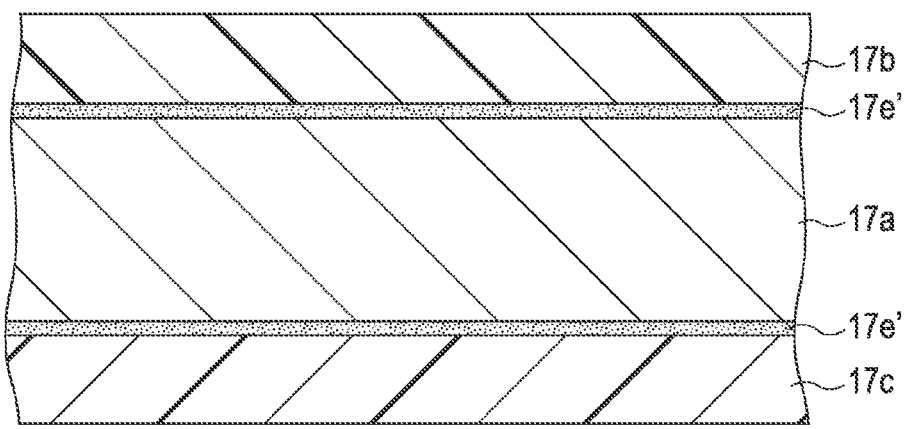
FIG. 6 is a cross-sectional view showing another structural example of the package member used for the nonaqueous electrolyte battery according to the first embodiment of the present invention.

Hereinafter, the structure (such as (4) or (9)) using an adhesive layer in which the blackbody material is dispersed will be described. As one example, the structure (4) is shown in FIG. 6. As shown in FIG. 6, a laminate film 17 having a structure as that of (4) includes the metal foil 17a, the outer layer film 17b, the inner layer film 17c, and adhesive layers 17e' in which the blackbody material is dispersed.

The adhesive layer 17e' in which the blackbody material is dispersed may be formed of an adhesive layer in which the blackbody material is dispersed in a material, such as a urethane resin, an acrylic resin, or a styrene resin. In this case, the adhesive layer 17e' independently has an emissivity of 0.6 or more. The content of the blackbody material in the adhesive layer 17e' is preferably in the range of 60 to 80 percent by weight of the adhesive layer 17e'. When the content of the blackbody material is too low, the heat dissipation characteristics are degraded. In addition, when the content of the blackbody material is too high, the function of the adhesive layer may be degraded in some cases.

Except that the adhesive layer 17e' in which the blackbody material is dispersed is formed, and that the blackbody material layer is not provided, the structure similar to that of the (a) may be formed.

As described above, since the laminate film 17 which has the layer containing the blackbody material is used, the heat dissipation effect of dissipating heat to the outside by using the blackbody radiation can be enhanced. In addition, in the above structures (1) to (9), the structures (1) to (5) in which the layer containing the blackbody material is provided outside the metal foil 17a (in a direction to the outside of the battery when the battery element 10 is packaged) is more preferable. The reason for this is believed that when the layer containing the blackbody material is provided outside the metal foil, the time necessary to propagate released heat to the outer surface can be decreased.

In addition, when the layer containing the blackbody material is provided outside the metal foil, the appearance of the laminate film 17 at an outer layer film side can be made black. Accordingly, pin holes and cracks generated in the laminate film 17 can be easily detected; hence, it is more preferable.

(1-2) Method for Manufacturing Nonaqueous Electrolyte Battery

This nonaqueous electrolyte battery 20 can be manufactured, for example, by the following procedure.

Formation of Positive Electrode

The positive electrode active material, the binder, and the conductive agent are uniformly mixed together to form a positive electrode mixture, and this positive electrode mixture is dispersed in a solvent to form a slurry. In this case, as long as the positive electrode active material, the binder, and the conductive agent are uniformly mixed together, the mixing ratio therebetween is not particularly limited. Next, after this slurry is uniformly applied on the positive electrode collector 11A by a doctor blade method or the like, the solvent is removed by compression and drying performed by a roll press machine or the like at a high temperature, so that the positive electrode active material layers 11B are formed. The positive electrode active material layers 11B are provided, for example, on two surfaces of the positive electrode collector 11A. In accordance with the structure of the battery element 10, the positive electrode active material layer 11B may be provided on one surface of the positive electrode collector 11A. In addition, as the solvent, for example, N-methyl-2-pyrrolidone may be used. Finally, the positive electrode terminal 15A is fitted on the positive electrode collector 11A at which the positive electrode active material layer 11B is not formed.

Formation of Negative Electrode

The negative electrode active material and the binder composed of a two-component copolymer are uniformly mixed together to form a negative electrode mixture, and this negative electrode mixture is dispersed in a solvent to form a slurry. In this case, as long as the negative electrode active material and the binder are uniformly mixed together, the mixing ratio therebetween is not particularly limited. In addition, the conductive agent may be added if necessary. Next, after this slurry is uniformly applied on the negative electrode collector by a doctor blade method or the like, the solvent is removed by compression and drying performed by a roll press machine or the like at a high temperature, so that the negative electrode active material layer is formed. As in the structure of the positive electrode 11, the negative electrode active material layer 12B may be provided on at least one surface of the negative electrode collector 12A. Finally, the negative electrode terminal 15B is fitted on the negative electrode collector 12A at which the negative electrode active material layer 12B is not formed.

Formation of Battery Element

The gel electrolyte layers 14 are formed on the surface of the positive electrode active material layer 11B of the positive electrode 11 thus formed and the surface of the negative electrode active material layer 12B of the negative electrode 12 thus formed. First, a sol precursor solution containing an electrolyte, a polymer compound, and a diluting solvent is prepared. As the polymer compound, a material composed of a three-component copolymer is used. Next, the sol precursor solution is applied to the respective surfaces of the positive electrode active material layer 11B and the negative electrode active material layer 12B, and subsequently, the diluting solution in the precursor solution is evaporated. As a result, the gel electrolyte layers 14 are formed.

Subsequently, the positive electrode 11 provided with the electrolyte layer 14 and the negative electrode 12 provided with the electrolyte layer 14 are laminated with the separators 13 interposed therebetween and are wound in a longitudinal direction. In this stage, by a protective tape 19, the electrodes and the like thus wound are fixed. Accordingly, the battery element 10 is formed.

Formation of Laminate Film (a) The case in which the blackbody material layer is provided.

The blackbody material layer 17d is formed, for example, by applying or spraying a paint containing the blackbody material, a base resin, and a solvent on the outer layer film 17b, the inner layer film 17c, or the metal foil 17a, followed by removing the solvent. As the solvent used in this case, for example, toluene, ethyl acetate, xylene, and 2-butanone may be used.

Subsequently, the outer layer film 17b, the metal foil 17a, and the inner layer film 17c are adhered to each other, for example, with the adhesive layers 17e provided therebetween to form the laminate film 17. In this stage, the blackbody material layer 17d formed on one surface of the outer layer film 17b, the metal foil 17a, or the inner layer film 17c is controlled so as to be placed at a desired position.

(b) The case in which the outer layer film containing the blackbody material dispersed therein is used.

When the outer layer film 17b' is formed, the blackbody material is mixed in a film material to form the outer layer film 17b'. Subsequently, the outer layer film 17b', the metal foil 17a, and the inner layer film 17c are adhered to each other with the adhesive layers 17e interposed therebetween, so that the laminate film 17 is formed.

(c) The case in which the inner layer film containing the blackbody material dispersed therein is used.

When the inner layer film 17c' is formed, the blackbody material is mixed in a film material to form the inner layer film 17c'. Subsequently, the outer layer film 17b, the metal foil 17a, and the inner layer film 17c' are adhered to each other with the adhesive layers 17e interposed therebetween, so that the laminate film 17 is formed.

(d) The case in which the adhesive layer containing the blackbody material dispersed therein is used.

By using an adhesive containing the blackbody material, the outer layer film 17b, the metal foil 17a, and the inner layer film 17c are adhered to each other with the adhesive layers 17e' interposed therebetween, so that the laminate film 17 is formed.

Subsequently, the battery element receiving portion 18 is formed by the laminate film 17 using deep drawing from an inner layer film 17c side to an outer layer film 17b side. In addition, after the battery element 10 is received in the battery element receiving portion 18 and is packaged by the laminate film 17, the peripheral portions of the laminate films 17 are adhered to each other by heat fusion or the like, so that the battery element 10 is sealed. In this stage, the tight sealing members 16 are provided at the positive electrode terminal 15A and the negative electrode terminal 15B at which the laminate films 17 are fused to each other. Accordingly, the nonaqueous electrolyte battery 20 shown in FIGS. 1 and 2 is completed.

(2) Second Embodiment

(2-1) Structure of Nonaqueous Electrolyte Battery

In the second embodiment, by using the battery element 10 similar to that in the first embodiment, a nonaqueous electrolyte battery 30 in which the battery element 10 is packaged with a hard laminate film and a soft laminate film will be described. In this second embodiment, description of structural portions similar to those of the first embodiment will be omitted.

In the second embodiment, a battery element packaged by a hard laminate film and a soft laminate film is called a nonaqueous electrolyte battery, and the nonaqueous electrolyte battery which is connected to a circuit substrate and which is fitted with a top cover and a rear cover is called a battery pack. In the battery pack and the nonaqueous electrolyte battery, a positive and a negative electrode terminal side is called a top portion, the side opposite to the top portion is called a bottom portion, and the others are called a side portion. In addition, the length in a side portion direction is called the width, and the length in a top portion-bottom portion direction is called the height.

(2-2) Structure of Battery Pack

Figure 7:
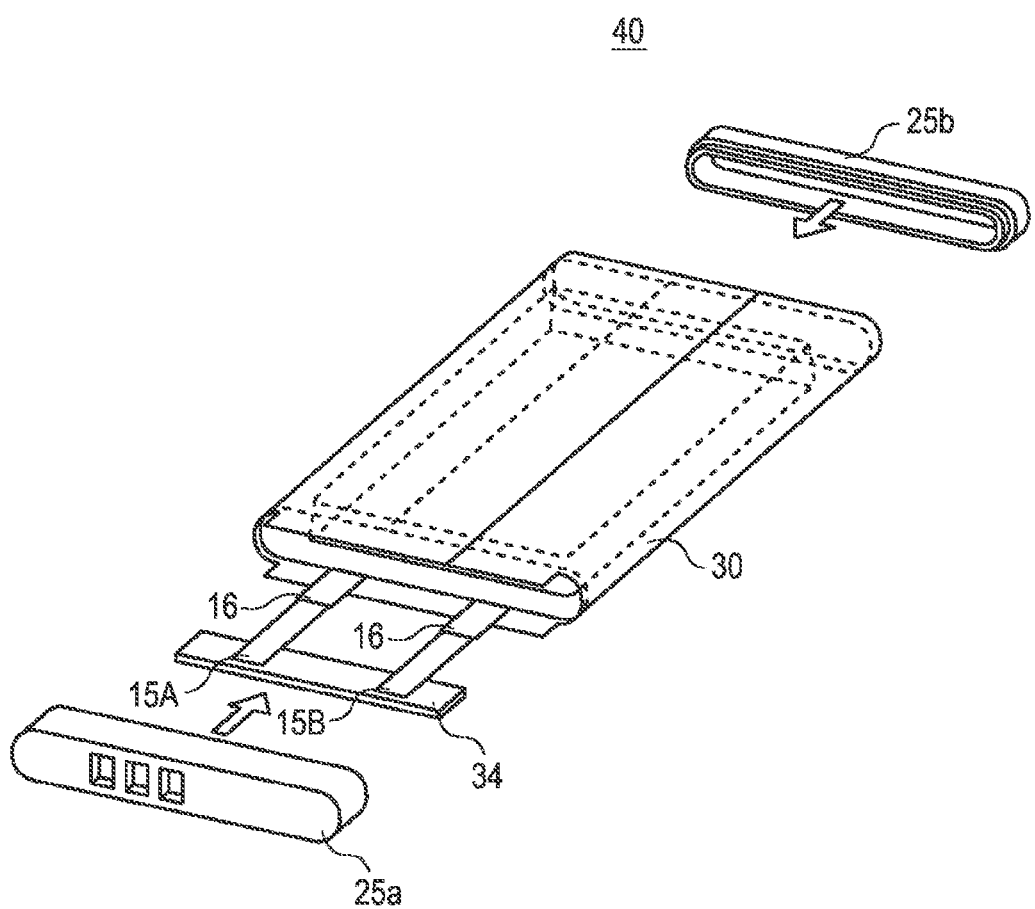
FIG. 7 is a schematic perspective view showing one structural example of a nonaqueous electrolyte battery according to a second embodiment of the present invention.

FIG. 7 shows one structural example of a battery pack 40 according to the second embodiment of the present invention. The battery pack 40 is, for example, a battery pack of a lithium ion polymer secondary battery having a rectangular or a flat shape. As shown in FIG. 7, this battery pack 40 includes the nonaqueous electrolyte battery 30 having two openings at two ends thereof in which the battery element 10 is received in a package member, a top cover 25a, and a bottom cover 25b, these covers being fitted to the respective openings at the two ends of the nonaqueous electrolyte battery 30.

Figure 8A:
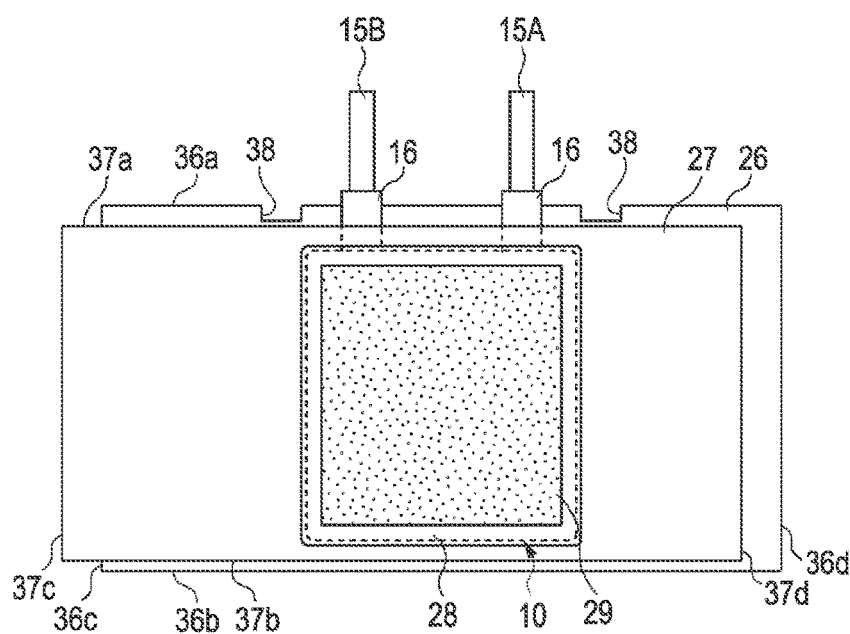
FIGS. 8A, 8B, and 8C are views showing one structural example of the nonaqueous electrolyte battery according to the second embodiment of the present invention.
Figure 8B:
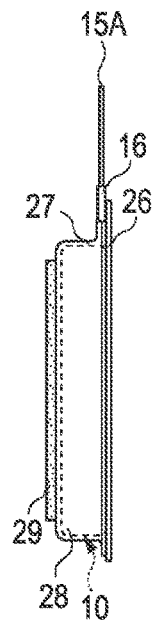
Figure 8C:
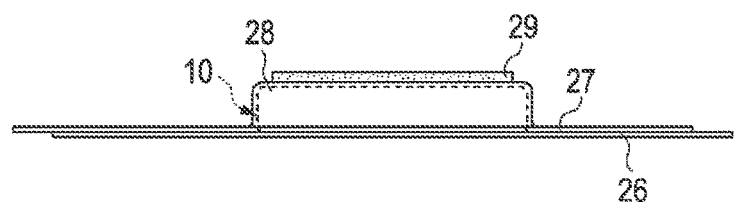

FIG. 8 shows the nonaqueous electrolyte battery 30 according to the second embodiment in process of manufacturing. The package member has a plate shape as a whole and includes a hard laminate film 26 having a rectangular shape when viewed in a plane direction and a soft laminate film 27 having a rectangular shape, the length of which in a height direction is shorter than that of the hard laminate film 26. The openings at the two ends of the nonaqueous electrolyte battery 30 each have a rectangular shape as a whole, and the two short sides thereof each protrude outside so as to form an oval arc.

The nonaqueous electrolyte battery 30 includes the soft laminate film 27 having a battery element receiving portion 28, the battery element 10 received in the battery element receiving portion 28, and the hard laminate film 26 provided so as to cover the opening of the battery element receiving portion 28 which receives the battery element 10.

In addition, from a sealing portion at which the hard laminate film 26 and the soft laminate film 27 are sealed to each other, the positive electrode terminal 15A and the negative electrode terminal 15B electrically connected to the positive electrode and the negative electrode, respectively, of the battery element 10 are extended.

The top cover 25a and the bottom cover 25b have shapes fittable to the respective openings at the two ends of the nonaqueous electrolyte battery 30. In particular, when viewed from a front surface, the covers each have a rectangular shape as a whole, and the two short sides of each cover protrude outside so as to form an oval arc. In addition, the front surface indicates a direction when the nonaqueous electrolyte battery 30 is viewed from a top portion side.

Hereinafter, with reference to FIGS. 7 to 10, the package member, the circuit substrate, the top cover 25a, and the bottom cover 25b will be described.

Package Member

As shown in FIGS. 7 and 8, this package member includes the soft laminate film 27 having the battery element receiving portion 28 in which the battery element 10 is received and the hard laminate film 26 provided on the soft laminate film 27 to cover the battery element receiving portion 28.

Hereinafter, the hard laminate film 26 will be described.

Figure 9:
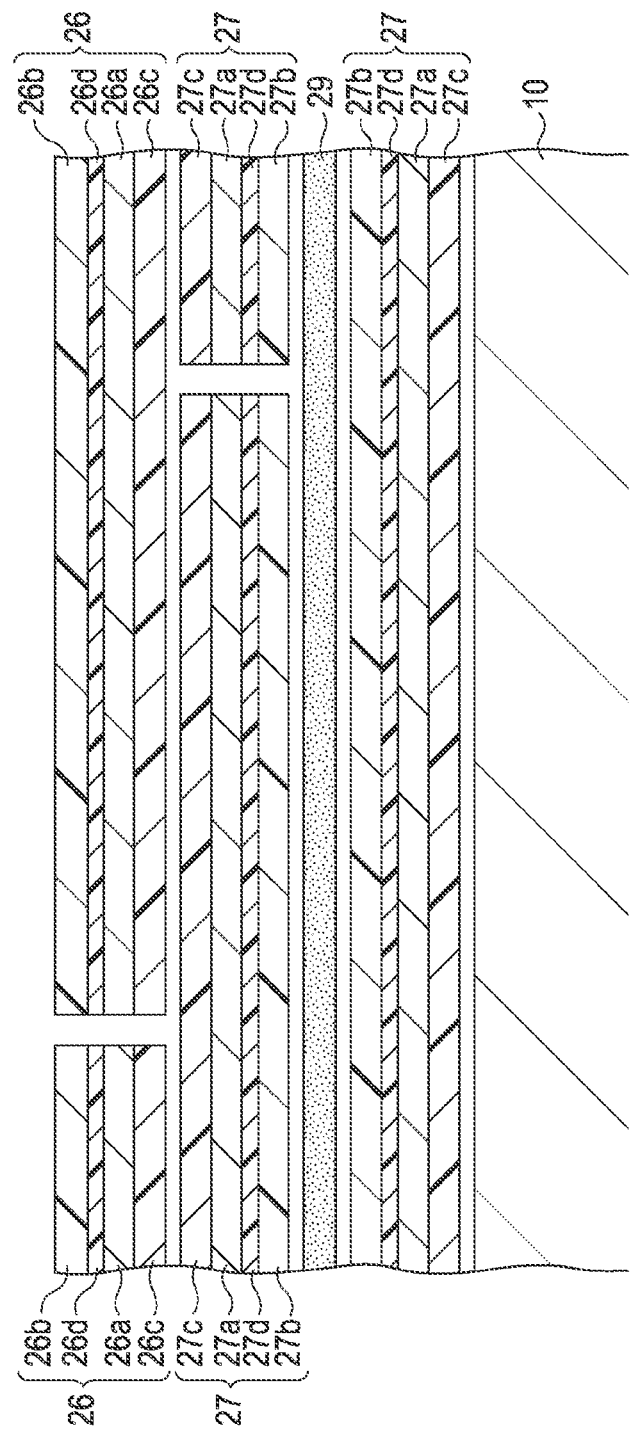
FIG. 9 is a cross-sectional view showing one structural example of the nonaqueous electrolyte battery according to the second embodiment of the present invention.

The hard laminate film 26 is rectangular and has a top long side 36a and a bottom long side 36b, the lengths of which are equal to each other, and two short sides 36c and 36d, the lengths of which are equal to each other. As shown in FIG. 9, in the state when the hard laminate film 26 wraps around the battery element receiving portion 28 in which the battery element 10 is received, the lengths of the top long side 36a and the bottom long side 36b of the hard laminate film 26 are designed so that the two short sides 36c and 36d come into contact with each other or face each other with a slight gap provided therebetween.

In addition, the top long side 36a of the hard laminate film 26 may be provided with notch portions 38 as shown in FIG. 8. As shown in FIG. 7, the notch portions 38 are provided so as to be located at the two short sides of the nonaqueous electrolyte battery 30 when viewed from the front surface. Since the notch portions 38 are provided, fitting of the top cover 25a can be easily performed.

The hard laminate film 26 has the same structure as that of the laminate film 17 except that a metal foil 26a is a hard metal foil. That is, the hard laminate film 26 at least includes the metal foil 26a, an outer layer film 26b, and an inner layer film 26c, and for example, as in the above (1), a blackbody material layer 26d is provided. In addition, as in the laminate film 17, the structure similar to that of one of the above (2) to (9) may also be formed.

The metal foil 26a of the hard laminate film 26 functions to maintain the shape after being bent and to withstand against deformation caused by an external force, and a hard metal material, such as aluminum (Al), stainless steel (SUS), iron (Fe), copper (Cu), or nickel (Ni), may be appropriately used. Among these mentioned above, aluminum (Al) and stainless steel (SUS) are most preferable, and in particular, for example, hard aluminum (JIS A3003P-H18) or (JIS A3004P-H18) without being processed by an annealing treatment or austenite stainless steel (SUS304) is preferably used.

The thickness of the metal foil 26a is preferably set in the range of 50 to 150 μm. When the thickness is less than 50 μm, the material strength is degraded. On the other hand, when the thickness is more than 150 μm, the workability is seriously degraded, and in addition, since the thickness of the hard laminate film 26 is increased, the volume efficiency of the battery pack 40 is degraded.

Hereinafter, the soft laminate film 27 will be described.

The lamination structure of the soft laminate film 27 is set similar to that of the laminate film 17. That is, the soft laminate film 27 at least includes a metal foil 27a, an outer layer film 27b, and an inner layer film 27c, and for example, as the structure of the above (1), a blackbody material layer 27d is provided. In addition, as in the laminate film 17, the structure similar to that of one of the above (2) to (9) may also be formed.

The soft laminate film 27 is rectangular and has a top long side 37a and a bottom long side 37b, the lengths of which are equal to each other, and two short sides 37c and 37d, the lengths of which are equal to each other, and at a central portion of the soft laminate film 27, the battery element receiving portion 28 receiving the battery element 10 is formed by drawing or the like. The lengths of the top long side 37a and the bottom long side 37b of the soft laminate film 27 are set larger than the width of the battery element receiving portion 28 in which the battery element 10 is received. In addition, according to this embodiment, the two facing sides of the soft laminate film 27 at the top and the bottom sides are each used as the long side, and the two facing sides orthogonal thereto are each used as the short side; however, depending on the shape of the battery element 10, the top and the bottom sides may be used as the short side, and the sides orthogonal thereto may be used as the long side.

In addition, the two short sides 37c and 37d of the soft laminate film 27 are set slightly smaller than the short sides 36c and 36d of the hard laminate film 26. Accordingly, the soft laminate film 27 can be laminated on the hard laminate film 26 so that at the top and the bottom sides of the nonaqueous electrolyte battery 30, only the hard laminate film 26 exists. At a portion at which only the hard laminate film 26 exists, the inner layer film 26c thereof is exposed; hence, when the top cover 25a and the bottom cover 25b are fitted, the inner layer film 26c can be adhered to the top cover 25a and the bottom cover 25b by heat fusion.

Circuit Substrate

A circuit substrate 34 is a substrate to which the positive electrode terminal 15A and the negative electrode terminal 15B of the battery element 10 are electrically connected. On the circuit substrate 34, besides a protective circuit including temperature protective elements, such as a fuse, a positive temperature coefficient (PCT) element, and a thermistor, for example, an ID resistor for discriminating a battery pack is mounted, and a plurality (such as three) of connection portions are further formed. In the protective circuit, charge and discharge control field effect transistors (FET), an integrated circuit (IC) for monitoring the battery element 10 and controlling the charge and discharge control FETs, and the like are provided.

The PCT element is connected to the battery element 10 in series, and when the temperature of the battery is increased higher than a set temperature, the electrical resistance of the PCT element is rapidly increased, so that the flow of current through the battery is practically stopped. The fuse is also connected to the battery element 10 in series, and when an overcurrent flows through the battery, the fuse is melted down by the current flowing therethrough, so that the flow of current is stopped. In addition, the fuse is provided with a heater resistor in the vicinity thereof, and since the temperature of the heater resistor is increased in overvoltage, meltdown of the fuse occurs, so that the flow of current is stopped.

In addition, when a terminal voltage of the battery element 10 is more than 4.3 to 4.4 V, hazardous events, such as heat generation and ignition, may occur in some cases. Hence, the protective circuit monitors the voltage of the battery element 10, and in an overcharge state in which the voltage is more than 4.3 to 4.4 V, the charge control FET is set in an OFF state, so that the charge is inhibited. Furthermore, when the terminal voltage of the battery element 10 is over-discharged to a discharge inhibition voltage or less, and when the voltage of the battery element 10 becomes 0 V, the battery element 10 is in an inside short-circuit state, and as a result, recharge may not be performed in some cases. Hence, the voltage of the battery element 10 is monitored, and when the battery element 10 is placed in an over-discharge state, the discharge control FET is set in an OFF state, so that the discharge is inhibited.

Top Cover

The top cover 25a is to be fitted to the top side opening of the nonaqueous electrolyte battery 30 and has a rectangular shape as a whole when viewed in a front surface direction, and the two short sides of the top cover 25a each expand outside so as to form an oval arc. A side wall to be fitted to the top side opening is provided on the surface of the top cover 25a at the side of the battery element 10. This side wall is provided partially or entirely along the periphery of the top cover 25a and is adhered to the end portion of the hard laminate film 26 by heat fusion.

The circuit substrate 34 is received in the top cover 25a. In order to expose a plurality of contact points of the circuit substrate 34 to the outside, a plurality of openings is provided in the top cover 25a at positions corresponding to the contact points. The contact points of the circuit substrate 34 are brought into contact with an electronic device through the openings in the top cover 25a. Accordingly, the battery pack 40 and the electronic device are electrically connected to each other. The top cover 25a as described above is formed by injection molding in advance.

Bottom Cover

The bottom cover 25b is to be fitted to the bottom side opening of the nonaqueous electrolyte battery 30 and has a rectangular shape as a whole when viewed in a front surface direction, and the two short sides of the bottom cover 25b each expand outside so as to form an oval arc. A side wall to be fitted to the bottom side opening is provided on the surface of the bottom cover 25b at the side of the battery element 10. This side wall is provided partially or entirely along the periphery of the bottom cover 25b and is adhered to the end portion of the hard laminate film 26 by heat fusion.

At least one penetrating hole and preferably at least two penetrating holes may be provided in the bottom cover 25b from the surface facing the battery element 10 to the surface opposite thereto. In this case, when a hot melt resin is charge through the penetrating hole, the nonaqueous electrolyte battery 30 and the bottom cover 25b can be more tightly adhered to each other. If at least two penetrating holes are provided, when a resin is charged, at least one penetrating hole can be used to remove air present between the battery element 10 and the bottom cover 25b, and hence filling properties of the resin can be improved.

The bottom cover 25b as described above is formed by injection molding in advance. In addition, a method for molding the bottom cover 25b integral with the nonaqueous electrolyte battery 30 may also be used in which the nonaqueous electrolyte battery 30 is placed in a mold, and a hot melt resin is charged in a bottom portion thereof.

(2-3) Method for Forming Battery Pack

Hereinafter, a method for manufacturing the battery pack 40 will be described.

Formation of Battery Element

The battery element 10 can be formed in a manner similar to that of the first embodiment.

Figure 10:
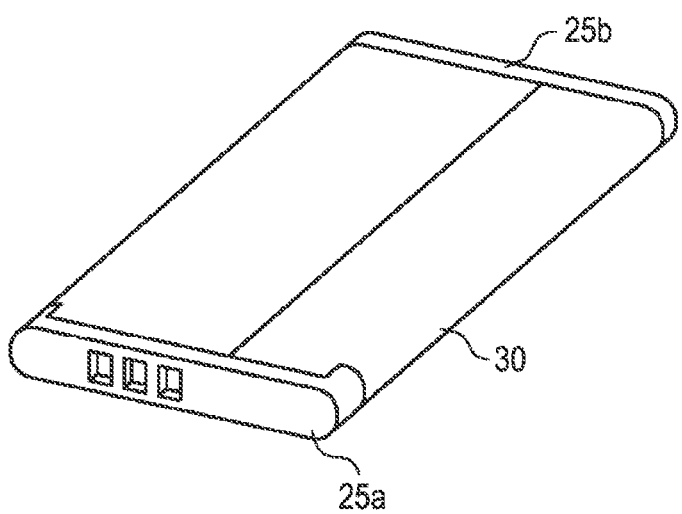
FIG. 10 is a schematic perspective view showing one structural example of the nonaqueous electrolyte battery according to the second embodiment of the present invention.

Next, as shown in FIGS. 9 and 10, the inner layer film 26c of the hard laminate film 26 and the inner layer film 27c of the soft laminate film 27 are disposed so as to face each other. In addition, after the battery element 10 is received in the battery element receiving portion 28, the hard laminate film 26 is overlapped on the soft laminate film 27 so as to cover the opening of the battery element receiving portion 28. Subsequently, an overlapped portion between the hard laminate film 26 and the soft laminate film 27 is sealed along the periphery of the battery element receiving portion 28. The sealing is performed using a metal heater head (not shown) to heat-fuse the inner layer film 26c of the hard laminate film 26 and the inner layer film 27c of the soft laminate film 27 under evacuation conditions.

Next, as shown in FIG. 9, the hard laminate film 26 is deformed so that the short sides 36c and 36d thereof come into contact with each other. In this case, since an adhesive film 29 is provided on the outside surface of the bottom portion of the battery element receiving portion 28 provided in the soft laminate film 27 at which the short sides 37c and 37d of the deformed soft laminate film 27 face each other and is then heated by a heater head, parts of the outer layer film 27b of the soft laminate film 27 are adhered to each other, thereby forming the nonaqueous electrolyte battery 30. When an unnecessarily high temperature is applied to the battery element 10, the battery element 10 may be damaged thereby. Hence, the temperature of the heater head is set so as to melt a resin material of the adhesive film 29. The adhesive film 29 is preferably formed of a material to be melted at a temperature at which the battery element 10 is not damaged.

Formation of Battery Pack

Next, as shown in FIG. 7, after the positive electrode terminal 15A and the negative electrode terminal 15B are connected to the circuit substrate 34, the circuit substrate 34 is received in the top cover 25a using a holder 25c molded so as to be fittable thereto. In addition, after the holder 25c is arranged to be located at a nonaqueous electrolyte battery 30 side, the top cover 25a is fitted to the top side opening of the nonaqueous electrolyte battery 30. In addition, the bottom cover 25b is fitted to the bottom side opening of the nonaqueous electrolyte battery 30.

Finally, the fitted portions of the top cover 25a and the bottom cover 25b are heated by a heater head, so that the top cover 25a and the bottom cover 25b are adhered to the inner layer film 26c of the hard laminate film 26. As a result, the battery pack 40 having the appearance shown in FIG. 10 is formed.

As described in the second embodiment, when the layers containing the blackbody material are provided in the hard laminate film 26 and the soft laminate film 27, in the battery pack according to the second embodiment, the heat dissipation characteristics can also be improved.

EXAMPLES

Hereinafter, particular examples of the present invention will be described in detail; however, the present invention is not limited thereto.

As the laminate film used in the following examples, one of the laminate films having the structures (1) to (9) was used.

(1) Outer layer film/blackbody material layer/adhesive layer/metal foil/adhesive layer/inner layer film (2) Outer layer film/adhesive layer/blackbody material layer/metal foil/adhesive layer/inner layer film (3) Outer layer film in which the blackbody material is dispersed/adhesive layer/metal foil/adhesive layer/inner layer film (4) Outer layer film/adhesive layer in which the blackbody material is dispersed/metal foil/adhesive layer/inner layer film (5) Outer layer film/blackbody material layer/outer layer film/adhesive layer/metal foil/adhesive layer/inner layer film (6) Outer layer film/adhesive layer/metal foil/adhesive layer/blackbody material layer/inner layer film (7) Outer layer film/adhesive layer/metal foil/blackbody material layer/adhesive layer/inner layer film (8) Outer layer film/adhesive layer/metal foil/adhesive layer/inner layer film in which the blackbody material is dispersed (9) Outer layer film/adhesive layer/metal foil/adhesive layer in which the blackbody material is dispersed/inner layer film (Basic structure) Outer layer film/adhesive layer/metal foil/adhesive layer/inner layer film Example 1

In Example 1, a battery pack was formed using a laminate film formed by changing the blackbody material, and a battery surface temperature in high-temperature storage was measured.

Example 1-1

Formation of Positive Electrode

After 92 percent by weight of lithium cobaltate (LiCoO2), 3 percent by weight of a powdered poly(vinylidene fluoride), and 5 percent by weight of a powdered graphite were uniformly mixed together, the mixture thus formed was dispersed in N-methyl-2-pyrrolidone, so that a positive electrode mixture in the form of slurry was prepared. This positive electrode mixture was uniformly applied to two surfaces of an aluminum foil to be used as a positive electrode collector, followed by vacuum drying at 100° C. for 24 hours, thereby forming a positive electrode active material layer.

Subsequently, after the positive electrode active material layer was press-molded by a roll press machine to form a positive electrode sheet, the positive electrode sheet was cut into a belt shape as a positive electrode, and a positive electrode terminal made of an aluminum film was welded thereto at a position at which the active material was not applied. Furthermore, a tight adhesion member made of a polypropylene resin film was adhered to the positive electrode terminal at which heat fusion layers of laminate films face each other when package is performed thereby.

Formation of Negative Electrode

After 91 percent by weight of an artificial graphite and 9 percent by weight of a powdered poly(vinylidene fluoride) were uniformly mixed together, the mixture thus formed was dispersed in N-methyl-2-pyrrolidone, so that a negative electrode mixture in the form of slurry was prepared. This negative electrode mixture was uniformly applied to two surfaces of a copper foil to be used as a negative electrode collector, followed by vacuum drying at 120° C. for 24 hours, thereby forming a negative electrode active material layer.

Subsequently, after the negative electrode active material layer thus formed was press-molded by a roll press machine to form a negative electrode sheet, the negative electrode sheet was cut into a belt shape as a negative electrode, and a negative electrode terminal made of a nickel foil was welded thereto at a position at which the active material was not applied. Furthermore, a sealant made of a polypropylene resin film was adhered to the negative electrode terminal at which the heat fusion layers of the laminate films face each other when package is performed thereby.

Formation of Electrolyte

Ethylene carbonate (EC) and propylene carbonate (PC) were mixed together at a weight ratio of 6:4 and were then dissolved in LiPF64 at a concentration of 0.8 mol/Kg, so that an electrolyte was formed. As a matrix polymer to be dispersed in this electrolyte, a copolymer which was obtained by polymerizing hexafluoropropylene (HFP) at a concentration of 7 percent by weight with respect to vinylidene fluoride (VdF) was used.

The matrix polymer described above, the electrolyte, and a diluting solvent were mixed together at a weight ratio of 1:10:10, so that a precursor solution in the form of a sol was formed. As the diluting solvent, dimethyl carbonate (DMC) was used. After this sol precursor solution was applied on the positive electrode active material layer and the negative electrode active material layer, the diluting solution was evaporated at a temperature of 100° C., so that gel electrolyte layers each having a thickness of 15 μm were formed on the positive electrode and the negative electrode.

Formation of Laminate Film

As shown in the above (1), a laminate film having a structure of an outer layer film/blackbody material layer/adhesive layer/metal foil/adhesive layer/inner layer film was formed. In this case, as the metal foil, an aluminum foil having a thickness of 50 μm was used, and as the inner layer film, a polypropylene (PP) having a thickness of 30 μm was used.

In addition, as the outer layer film, there was used a film in which a blackbody material layer was provided on a metal foil-side surface of a poly(ethylene terephthalate) having a thickness of 30 μm. The blackbody material layer was formed to have a thickness of 2.0 μm by applying a blackbody solution in which 70 percent by weight of a carbon black having an average particle diameter D50 of 0.5 μm functioning as the blackbody material and 30 percent by weight of an acrylic resin were mixed together to one surface of the outer layer film.

In this case, the blackbody material layer was formed on the surface of an aluminum foil to have a thickness of 10 μm, and the emissivity of the surface of the blackbody material layer was obtained by a reflection measurement method. The emissivity was obtained in such a way that the reflectance was measured by obtaining the average reflection intensity in the wavelength region of 4 to 24 μm (2,500 cm-1 to 400 cm-1) using a Fourier transformer infrared (FT-IR) spectrometer, and the emissivity (in the range of 0 to 1) was obtained from the equation: (1-reflectance). In Example 1-1, the emissivity was 0.82.

The outer layer film provided with the blackbody material layer and the inner layer film were adhered to the metal foil with adhesive layers each having a thickness of 5 μm therebetween. In this case, the blackbody material layer provided on the outer layer film was arranged to be located at a metal foil side.

Assembly of Nonaqueous Electrolyte Battery

The positive electrode and the negative electrode each provided with the gel electrolyte layer were laminated and wound with porous polyethylene separators interposed therebetween, so that a flat battery element was formed. In this case, a battery element having a height of 60 mm, a width of 40 mm, and a thickness of 5 mm was formed to have a discharge capacity of 900 mAh when the full charge voltage and the discharge end voltage were set to 4.2 V and 3.0 V, respectively. This battery element was packaged by a package member composed of aluminum laminate films using carbon black as the above blackbody material. After the battery element was received in the recess portion formed in the aluminum laminate film and was packaged, individual sides of the laminates films along the periphery of the battery element were adhered to each other by heat fusion and vacuum-sealed, so that a test battery was formed.

Example 1-2

Except that when the laminate film was formed, graphite was used as the blackbody material, a test battery was formed in a manner similar to that of Example 1-1. In addition, when the emissivity of the blackbody material layer using graphite was measured as in Example 1-1, the emissivity was 0.85.

Example 1-3

Except that when the laminate film was formed, iron black (FeOFe$_2$O$_3$) was used as the blackbody material, a test battery was formed in a manner similar to that of Example 1-1. In addition, when the emissivity of the blackbody material layer using iron black (FeOFe$_2$O$_3$) was measured as in Example 1-1, the emissivity was 0.79.

Example 1-4

Except that when the laminate film was formed, a chromite spinel solid solution was used as the blackbody material, a test battery was formed in a manner similar to that of Example 1-1. In addition, when the emissivity of the blackbody material layer using a chromite spinel solid solution was measured as in Example 1-1, the emissivity was 0.81.

Example 1-5

Except that when the laminate film was formed, aniline black was used as the blackbody material, a test battery was formed in a manner similar to that of Example 1-1. In addition, when the emissivity of the blackbody material layer using aniline black was measured as in Example 1-1, the emissivity was 0.83.

Comparative Example 1-1

Except that a laminate film was formed in which no blackbody material layer was provided as in the above basic structure, a test battery was formed in a manner similar to that of Example 1-1. In addition, since no blackbody material layer was provided in Comparative Example 1-1, when the emissivity of the aluminum metal layer was measured as in Example 1-1, the emissivity was 0.12.

Comparative Example 1-2

Except that when the laminate film was formed, carbon black was used as the blackbody material, and the content of the carbon black in the blackbody material layer was set to 45 percent by weight, a test battery was formed in a manner similar to that of Example 1-1. In addition, when the emissivity of the blackbody material layer using carbon black of Comparative Example 1-2 was measured as in Example 1-1, the emissivity was 0.53.

Evaluation of Battery (a) High-Temperature Storage Test

The test batteries of the above examples and comparative examples were each charged to a voltage of 4.35 V and were then held in an oven at an environmental temperature of 130° C. Subsequently, after the test batteries were each held for 30 minutes or 60 minutes in an environment of a temperature of 130° C., the surface temperature of each test battery was measured. The surface temperature of each test battery was measured by pressing a thermocouple to the surface thereof.

In the following Table 1, the results of the above evaluation are shown.

TABLE 1

| | Structure of laminate film | Blackbody material | Particle diameter of blackbody material (μm) | Content of blackbody material (wt %) | Thickness (μm) | Emissivity | Temperature after 30 minutes (° C.) | Temperature after 60 minutes (° C.) |
|---|---|---|---|---|---|---|---|---|
| Example 1-1 | (1) | Carbon black | 0.5 | 70 | 2.0 | 0.82 | 102 | 131 |
| Example 1-2 | (1) | Graphite | 0.5 | 70 | 2.0 | 0.85 | 103 | 130 |
| Example 1-3 | (1) | Graphite | 0.5 | 70 | 2.0 | 0.79 | 102 | 132 |
| Example 1-4 | (1) | Spinel solid solution | 0.5 | 70 | 2.0 | 0.81 | 104 | 132 |
| Example 1-5 | (1) | Aniline black | 0.5 | 70 | 2.0 | 0.83 | 105 | 131 |
| Comparative Example 1-1 | Basic structure | — | — | — | — | 0.12 | 115 | 144 |
| Comparative Example 1-2 | (1) | Carbon black | 0.5 | 45 | 2.0 | 0.53 | 111 | 139 |

As shown in Table 1, it was found that when the layer containing the blackbody material was provided in the laminate film, the heat dissipation characteristics were improved, and the surface temperature of the battery after the high-temperature storage was not likely to increase. In addition, it was also found that when the emissivity was 0.6 or more as in Examples 1-1 to 1-5, a particularly significant effect could be obtained as compared to Comparative Example 1-2.

Example 2

In Example 2, a battery pack was formed by changing the structure of the laminate film, and the battery surface temperature in high-temperature storage was measured.

Example 2-1

A test battery was formed in a manner similar to that of Example 1-1.

Example 2-2

As shown in the above (2), a laminate film composed of an outer layer film/adhesive layer/blackbody material layer/metal foil/adhesive layer/inner layer film was formed. In this case, the blackbody material layer was formed on the metal foil at an outer layer film side. The blackbody material layer was formed by applying a blackbody solution which contained 30 percent by weight of an acrylic resin and 70 percent by weight of carbon black to one surface of the metal foil to have a thickness of 2.0 μm, the carbon black functioning as the blackbody material and having an average particle diameter D50 of 0.5 μm. Except that described above, a test battery was formed in a manner similar to that of Example 1-1.

Example 2-3

As shown in the above (3), a laminate film composed of an outer layer film in which the blackbody material was dispersed/adhesive layer/metal foil/adhesive layer/inner layer film was formed. In this case, as the outer layer film in which the blackbody material was dispersed, a poly(ethylene terephthalate) (PET) film which contained 70 percent by weight of the blackbody material and which had a thickness of 30 μm was used. Except that described above, a test battery was formed in a manner similar to that of Example 1-1.

Example 2-4

As shown in the above (4), a laminate film composed of an outer layer film/adhesive layer in which the blackbody material was dispersed/metal foil/adhesive layer/inner layer film was formed. In this case, as the adhesive layer in which the blackbody material was dispersed, an adhesive layer which contained 70 percent by weight of the blackbody material and which had a thickness of 5 μm was used. Except that described above, a test battery was formed in a manner similar to that of Example 1-1.

Example 2-5

As shown in the above (5), a laminate film composed of an outer layer film/blackbody material layer/outer layer film/adhesive layer/metal foil/adhesive layer/inner layer film was formed. In this case, the blackbody material layer was formed on one surface of the outer layer film, and a poly(ethylene terephthalate) (PET) layer having a thickness of 30 μm was formed on the surface of the blackbody material layer provided on the outer layer film. Except that described above, a test battery was formed in a manner similar to that of Example 1-1.

Example 2-6

As shown in the above (6), a laminate film composed of an outer layer film/adhesive layer/metal foil/adhesive layer/blackbody material layer/inner layer film was formed. In this case, the blackbody material layer was formed on the inner layer film at a metal foil side. Except that described above, a test battery was formed in a manner similar to that of Example 1-1.

Example 2-7

As shown in the above (7), a laminate film composed of an outer layer film/adhesive layer/metal foil/blackbody material layer/adhesive layer/inner layer film was formed. In this case, the blackbody material layer was formed on the metal foil at an inner layer film side. Except that described above, a test battery was formed in a manner similar to that of Example 1-1.

Example 2-8

As shown in the above (8), a laminate film composed of an outer layer film/adhesive layer/metal foil/adhesive layer/inner layer film in which the blackbody material was dispersed was formed. In this case, as the inner layer film in which the blackbody material was dispersed, a polypropylene (PP) film which contained 70 percent by weight of the blackbody material and which had a thickness of 30 μm was used. Except that described above, a test battery was formed in a manner similar to that of Example 1-1.

Example 2-9

As shown in the above (9), a laminate film composed of an outer layer film/adhesive layer/metal foil/adhesive layer in which the blackbody material was dispersed/inner layer film was formed. In this case, as the adhesive layer in which the blackbody material was dispersed, an adhesive layer which contained 70 percent by weight of the blackbody material and which had a thickness of 5 μm was used. Except that described above, a test battery was formed in a manner similar to that of Example 1-1.

Comparative Example 2-1

Except that a laminate film composed of an outer layer film/adhesive layer/metal foil/adhesive layer/inner layer film, which contained no blackbody material layer as in the basic structure, was formed, a test battery was formed in a manner similar to that of Example 1-1.
Evaluation of Battery
(a) High-Temperature Storage Test
The test batteries of the above examples and comparative example were each charged to a voltage of 4.35 V and were then held in an oven at an environmental temperature of 130° C. Subsequently, after the test batteries were each held for 5 minutes, 10 minuets, 30 minutes or 60 minutes in an environment of a temperature of 130° C., the surface temperature of each test battery was measured. The surface temperature of each test battery was measured by pressing a thermocouple to the surface thereof.

In the following Table 2, the results of the above evaluation are shown.

TABLE 2

| | | Blackbody material layer | | | | | | | |
|---|---|---|---|---|---|---|---|---|---|
| | Structure of laminate film | Blackbody material | Particle diameter of blackbody material (μm) | Blackbody material-containing layer | Content of blackbody material (wt %) | Thickness (μm) | Temperature after 5 min. (° C.) | Temperature after 10 min. (° C.) | Temperature after 30 min. (° C.) | Temperature after 60 min. (° C.) |
| Example 2-1 | (1) | Carbon black | 0.5 | Blackbody material layer | 70 | 2.0 | 26 | 42 | 102 | 131 |
| Example 2-2 | (2) | Carbon black | 0.5 | Blackbody material layer | 70 | 2.0 | 27 | 42 | 98 | 128 |
| Example 2-3 | (3) | Carbon black | 0.5 | Outer layer film | 70 | 30 | 35 | 54 | 105 | 137 |
| Example 2-4 | (4) | Carbon black | 0.5 | Adhesive layer | 70 | 5.0 | 31 | 48 | 98 | 129 |
| Example 2-5 | (5) | Carbon black | 0.5 | Blackbody material layer | 70 | 2.0 | 36 | 54 | 108 | 139 |
| Example 2-6 | (6) | Carbon black | 0.5 | Blackbody material layer | 70 | — | 39 | 58 | 112 | 142 |
| Example 2-7 | (7) | Carbon black | 0.5 | Blackbody material layer | 70 | 2.0 | 39 | 58 | 113 | 143 |
| Example 2-8 | (8) | Carbon black | 0.5 | Inner layer film | 70 | 30 | 41 | 61 | 114 | 143 |
| Example 2-9 | (9) | Carbon black | 0.5 | Adhesive layer | 70 | 5.0 | 42 | 59 | 113 | 144 |
| Comparative Example 2-1 | Basic structure | — | — | — | — | — | 42 | 61 | 115 | 144 |

As shown in Table 2, it was found that when the layer containing the blackbody material was provided in the laminate film, the heat dissipation characteristics were improved, and the surface temperature of the battery after the high-temperature storage was not likely to increase. In particular, it was also found that when the layer containing the blackbody material was provided at the outside of the battery with respect to the metal foil of the laminate film, the heat dissipation effect was further improved. The reason for this is believed that when the layer containing the blackbody material is provided at the outside of the metal foil, the time to propagate released heat to the outer surface can be decreased.

In addition, the blackbody material layer is preferably provided as compared to the case in which the blackbody material is contained in the outer layer film, the inner layer film, or the adhesive layer. The reason for this is believed that when the blackbody material is contained in the outer layer film, the inner layer film, or the adhesive layer, it is not easy to maintain properties of the film containing the blackbody material, and the film properties are liable to be degraded. For example, when the blackbody material is contained in the adhesive layer, the adhesion effect thereof may be degraded in some cases.

It was found that compared to the structures of (3) and (4) in which the blackbody material was contained in the outer layer film and the adhesive layer, respectively, according to the structures of (1) and (2) in which the blackbody material layer was provided, significantly high heat dissipation characteristics can be obtained, in particular, in a period of 10 minutes from the start of the high-temperature storage. In addition, in the structure of (5) in which the two outer layer films were provided with the blackbody material layer interposed therebetween, although the heat dissipation effect was degraded due to an increase in thickness of the outer layer film, the heat dissipation effect was high as compared to that of the structures of (6) to (9) in which the layer containing the blackbody material was provided inside the metal foil.

In addition, even in the case in which the layer containing the blackbody material was provided inside the metal foil, a higher heat dissipation effect was obtained when a laminate film in which the blackbody material layer was provided was used.

Example 3

In Example 3, a battery pack was formed using a laminate film in which the particle diameter of the blackbody material was changed, and the battery surface temperature in high-temperature storage was measured.

Example 3-1

A test battery was formed in a manner similar to that of Example 1-1 except that the particle diameter D50 of carbon black functioning as the blackbody material was set to 0.1 µm.

Example 3-2

A test battery was formed in a manner similar to that of Example 1-1 except that the particle diameter D50 of carbon black functioning as the blackbody material was set to 0.3 µm.

Example 3-3

A test battery was formed in a manner similar to that of Example 1-1 except that the particle diameter D50 of carbon black functioning as the blackbody material was set to 0.5 µm.

Example 3-4

A test battery was formed in a manner similar to that of Example 1-1 except that the particle diameter D50 of carbon black functioning as the blackbody material was set to 0.75 µm.

Example 3-5

A test battery was formed in a manner similar to that of Example 1-1 except that the particle diameter D50 of carbon black functioning as the blackbody material was set to 1.0 µm.

Example 3-6

A test battery was formed in a manner similar to that of Example 1-1 except that the particle diameter D50 of carbon black functioning as the blackbody material was set to 2.0 µm.

Example 3-7

A test battery was formed in a manner similar to that of Example 1-1 except that the particle diameter D50 of carbon black functioning as the blackbody material was set to 3.0 m.

Comparative Example 3-1

A test battery was formed in a manner similar to that of Example 1-1 except that the blackbody material layer was not provided in the laminate film as in the above basic structure.

Evaluation of Battery (a) High-Temperature Storage Test

The test batteries of the above examples and comparative example were each charged to a voltage of 4.35 V and were then held in an oven at an environmental temperature of 130° C. Subsequently, after the test batteries were each held for 30 minutes or 60 minutes in an environment of a temperature of 130° C., the surface temperature of each test battery was measured. The surface temperature of each test battery was measured by pressing a thermocouple to the surface thereof.

In the following Table 3, the results of the above evaluation are shown.

TABLE 3

| | | Blackbody material layer | | | |
| | Structure of laminate film | Blackbody material | Particle diameter of blackbody material (µm) | Thickness (µm) | Temperature after 30 min. (° C.) | Temperature after 60 min. (° C.) |
|---|---|---|---|---|---|---|
| Example 3-1 | (1) | Carbon black | 0.1 | 2.0 | 96 | 119 |
| Example 3-2 | (1) | Carbon black | 0.3 | 2.0 | 98 | 124 |
| Example 3-3 | (1) | Carbon black | 0.5 | 2.0 | 102 | 131 |
| Example 3-4 | (1) | Carbon black | 0.75 | 2.0 | 103 | 133 |
| Example 3-5 | (1) | Carbon black | 1.0 | 2.0 | 105 | 134 |
| Example 3-6 | (1) | Carbon black | 2.0 | 2.0 | 111 | 139 |
| Example 3-7 | (1) | Carbon black | 3.0 | 2.0 | 112 | 141 |
| Comparative Example 3-1 | Basic structure | — | — | — | 115 | 144 |

As shown in Table 3, it was found that in Examples 3-1 to 3-7 in which the blackbody material layer was provided, the heat dissipation effect was improved as the particle diameter of the blackbody material was decreased, and that the heat dissipation effect was not likely to obtain as the particle diameter was increased. In addition, when the particle diameter of the blackbody material was increased, the thickness of the blackbody material layer was necessarily increased to obtain the stability thereof, and as a result, the volume efficiency of the battery pack was degraded in some cases.

Example 4

In Example 4, the heat dissipation effect of the battery pack was confirmed by changing the thickness of the inner layer film of the laminate film.

Example 4-1

As in the case of Example 1-1, a test battery was formed using an inner layer film having a thickness of 30 μm.

Example 4-2

A test battery was formed in a manner similar to that of Example 1-1 except that the thickness of the inner layer film was set to 40 μm.

Example 4-3

A test battery was formed in a manner similar to that of Example 1-1 except that the thickness of the inner layer film was set to 50 μm.

Example 4-4

A test battery was formed in a manner similar to that of Example 1-1 except that the thickness of the inner layer film was set to 60 μm.

Example 4-5

A test battery was formed in a manner similar to that of Example 1-1 except that the thickness of the inner layer film was set to 75 μm.

Example 4-6

A test battery was formed in a manner similar to that of Example 1-1 except that the thickness of the inner layer film was set to 100 μm.

Comparative Example 4-1

A test battery was formed in a manner similar to that of Example 1-1 except that the blackbody material layer was not provided in the laminate film as in the above basic structure.

Evaluation of Battery (a) High-Temperature Storage Test

The test batteries of the above examples and comparative example were each charged to a voltage of 4.35 V and were then held in an oven at an environmental temperature of 130° C. Subsequently, after the test batteries were each held for 30 minutes or 60 minutes in an environment of a temperature of 130° C., the surface temperature of each test battery was measured. The surface temperature of each test battery was measured by pressing a thermocouple to the surface thereof.

In the following Table 4, the results of the above evaluation are shown.

TABLE 4

| | | Blackbody material layer | | | | |
|---|---|---|---|---|---|---|
| | Structure of laminate film | Blackbody material | Particle diameter of blackbody material (μm) | Thickness (μm) | Thickness of inner layer film (μm) | Temperature after 30 min. (° C.) | Temperature after 60 min. (° C.) |
| Example 4-1 | (1) | Carbon black | 0.5 | 2.0 | 30 | 102 | 131 |
| Example 4-2 | (1) | Carbon black | 0.5 | 2.0 | 40 | 105 | 133 |
| Example 4-3 | (1) | Carbon black | 0.5 | 2.0 | 50 | 108 | 137 |
| Example 4-4 | (1) | Carbon black | 0.5 | 2.0 | 60 | 111 | 140 |
| Example 4-5 | (1) | Carbon black | 0.5 | 2.0 | 75 | 113 | 140 |
| Example 4-6 | (1) | Carbon black | 0.5 | 2.0 | 100 | 114 | 142 |
| Comparative Example 4-1 | Basic structure | — | — | — | 30 | 115 | 144 |

As shown in Table 4, compared to Comparative Example 4-1 in which the laminate film was used which had an inner layer film having a thickness equivalent to that of Example 4-1 and which contained no blackbody material layer, in Example 4-1 in which the laminate film containing the blackbody material layer was used, a high heat dissipation effect was obtained. In addition, it was found that when the blackbody material layer was provided, and the thickness of the inner layer film was changed, a higher heat dissipation effect was obtained as the thickness of the inner layer film was decreased. It was also found that when the thickness of the inner layer film was large, the rate of heat conduction from the battery element became low, and hence heat generated in the battery element was not sufficiently dissipated.

Example 5

In Example 5, the surface color of the laminate film was changed with or without providing the blackbody material layer, and detection accuracy of pinholes was confirmed.

Example 5-1

As shown in the above (1), a laminate film was formed to have the structure of an outer layer film/blackbody material layer/adhesive layer/metal foil/adhesive layer/inner layer film.

Comparative Example 5-1

As shown in the above basic structure, a laminate film was formed to have the structure of an outer layer film/adhesive layer/metal foil/adhesive layer/inner layer film.

(b) Conformation of Detection Limit of Diameter of Pinholes

After pinholes were formed in the laminate films of the example and the comparative example, light was radiated from an inner layer film side, and the presence of pinholes was confirmed from an outer layer film side by visual inspection. The diameter of pinholes was gradually decreased, and by the method described above, the detection limit of the diameter of pinholes was confirmed from the outer layer film side by visual inspection.

In the following Table 5, the results of the above evaluation are shown.

TABLE 5

| | | Blackbody material layer | | | |
|---|---|---|---|---|---|
| | Structure of laminate film | Blackbody material | Particle diameter of blackbody material ($\mu$m) | Thickness ($\mu$m) | Surface color of laminate film | Detection limit of diameter of pinholes (mm) |
| Example 5-1 | (1) | Carbon black | 0.5 | 2.0 | Black | 0.275 |
| Comparative Example 5-1 | Basic structure | — | — | — | Silver | 0.450 |

As shown in Table 5, in Example 5-1 in which the surface color was made black by the blackbody material layer, the detection limit of the diameter of pinholes was 0.275 mm, and hence a sufficiently small pinhole was confirmed as compared to the Comparative Example 5-1 in which the surface color was made silver and the detection limit of the diameter of pinholes was 0.450 mm.

As described above, when the blackbody material layer was provided outside the metal foil, the surface color of the battery pack was made black, and hence the detection accuracy of pinholes, cracks, and the like could be improved.

The present invention has been described with reference to the embodiments and examples; however, the present invention is not limited to the above embodiments and examples and may be variously modified without departing from the scope of the present invention. For example, the materials and numerical values of the battery element and the laminate film have been merely described by way of example, and different materials and numerical values may also be used.

In addition, as for the structure of the laminate film which includes the layer containing the blackbody material, the structure other than those shown in the embodiments of the present invention may also be used.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A battery package configured to accommodate a battery element of a nonaqueous electrolyte battery, the battery package comprising:
   a first layer;
   a second layer including a carbon particle; and
   a metal layer,
   wherein the second layer is directly provided on the metal layer and the second layer is between the first layer and the metal layer,
   wherein the carbon particle has an particle diameter of 1.0 $\mu$m or less, and
   wherein the second layer has a thickness of 1 $\mu$m to 5 $\mu$m.

2. The battery package according to claim 1, wherein the carbon particle has a particle diameter of 0.5 $\mu$m or less.

3. A nonaqueous electrolyte battery comprising:
   a battery element;
   a nonaqueous electrolyte; and
   a battery package configured to accommodate the battery element,
   wherein the battery package comprising:
   a first layer;
   a second layer including a carbon particle; and
   a metal layer,
   wherein the second layer is directly provided on the metal layer and the second layer is between the first layer and the metal layer,
   wherein the carbon particle has a particle diameter of 1.0 $\mu$m or less, and
   wherein the second layer has a thickness of 1 $\mu$m to 5 $\mu$m.

4. The battery according to claim 3, wherein the second layer has CMY values of C (cyan), M (magenta), and Y (yellow) that are each 70 or more.

5. The battery according to claim 3, wherein the metal layer includes at least one of aluminum, stainless steel, titanium, copper, or iron plated with tin, zinc, or nickel.

6. The battery according to claim 3,
   wherein the carbon particle has a particle diameter of 0.5 $\mu$m or less.

7. The battery according to claim 6, wherein an exterior color of the battery package is a black color.

8. The battery according to claim 7, wherein an outer surface of the first layer includes at least one of letters or patterns.

9. The battery according to claim 8, wherein the black color indicates CMY values of C (cyan), M (magenta), and Y (yellow) that are each 70 or more.

10. The battery according to claim 9, wherein the first layer includes at least one of a nylon, a poly(ethylene terephthalate), a poly(ethylene naphthalate), a poly(butylene terephthalate), or a poly(butylene naphthalate).

11. The battery according to claim 10, wherein the second layer further includes a resin.

12. The battery according to claim 11, wherein the metal layer has a thickness of 50 μm to 150 μm.

13. The battery according to claim 12,
wherein the carbon particle has an emissivity of 0.6 or more.

14. The battery according to claim 13, further comprising a third layer provided between the first layer and the second layer.

15. The battery according to claim 14, wherein the first layer is an outer layer and the third layer is an adhesive layer.

16. A nonaqueous electrolyte battery comprising:
a battery element;
a nonaqueous electrolyte; and
a battery package configured to accommodate the battery element,
wherein the battery package comprising:
  a first layer;
  a second layer including a carbon material; and
  a metal layer,
  wherein the second layer is directly provided on the metal layer and the second layer is between the first layer and the metal layer, and
  wherein an amount of the carbon material in the second layer is 60 to 80 percent by weight.

* * * * *